US012142865B2

(12) United States Patent
Kumondai et al.

(10) Patent No.: US 12,142,865 B2
(45) Date of Patent: Nov. 12, 2024

(54) PIN TERMINAL, CONNECTOR, WIRING HARNESS WITH CONNECTOR AND CONTROL UNIT

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Mitsuhiro Kumondai, Mie (JP); Akihiro Kato, Mie (JP); Yoshifumi Saka, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 422 days.

(21) Appl. No.: 17/760,580

(22) PCT Filed: Aug. 31, 2020

(86) PCT No.: PCT/JP2020/032929
§ 371 (c)(1),
(2) Date: Mar. 15, 2022

(87) PCT Pub. No.: WO2021/054105
PCT Pub. Date: Mar. 25, 2021

(65) Prior Publication Data

US 2022/0344847 A1 Oct. 27, 2022

(30) Foreign Application Priority Data

Sep. 19, 2019 (JP) ................................ 2019-170928

(51) Int. Cl.
*H01R 13/03* (2006.01)
*H01B 5/02* (2006.01)
(Continued)

(52) U.S. Cl.
CPC ............... *H01R 13/03* (2013.01); *H01B 5/02* (2013.01); *H01B 7/0045* (2013.01); *H01R 12/58* (2013.01); *H01R 13/502* (2013.01); *H01R 43/16* (2013.01)

(58) Field of Classification Search
CPC ...... H01R 13/03; H01R 13/502; H01R 12/58; H01R 43/16; H01B 5/02; H01B 7/0045
(Continued)

(56) References Cited

U.S. PATENT DOCUMENTS 7,700,883 B2 * 4/2010 Masago .................. C23C 26/02 174/126.2
8,142,906 B2 * 3/2012 Taira ........................ C25D 5/12 205/228
(Continued)

FOREIGN PATENT DOCUMENTS

CN 102185188 A * 9/2011 ............ H01R 13/03
JP 2005-206942 A 8/2005
(Continued)

OTHER PUBLICATIONS

International Search Report issued on Nov. 24, 2020 for WO 2021/054105 A1 (4 pages).

*Primary Examiner* — Peter G Leigh
(74) *Attorney, Agent, or Firm* — Venjuris, P.C.

(57) ABSTRACT

A pin terminal includes a bar-like base material and a plating layer covering a predetermined region of the base material. A constituent material of the base material is pure copper or a copper alloy. The plating layer includes a tin-based layer made of metal containing tin. One end side of the base
(Continued)

material includes a tip covering portion. The tin-based layer includes the tip covering portion. The tip covering portion covers an entire region in a circumferential direction on the one end side of the base material. A difference $(t_1-t_2)$ between a maximum value $t_1$ and a minimum value $t_2$ of a thickness of the tip covering portion measured at a measurement location set at a spot of 1 mm from one end of the pin terminal along a longitudinal direction of the pin terminal is 0.20 μm or more.

18 Claims, 11 Drawing Sheets

(51) Int. Cl.

| | |
|---|---|
| ***H01B 7/00*** | (2006.01) |
| ***H01R 12/58*** | (2011.01) |
| ***H01R 13/502*** | (2006.01) |
| ***H01R 43/16*** | (2006.01) |

(58) Field of Classification Search

USPC .......................................................... 438/886

See application file for complete search history.

(56) References Cited

U.S. PATENT DOCUMENTS

| | | | | |
|---|---|---|---|---|
| 2008/0257581 | A1* | 10/2008 | Masago | C25D 5/34<br>174/126.2 |
| 2016/0240950 | A1* | 8/2016 | Watanabe | H01R 43/16 |
| 2020/0076103 | A1 | 3/2020 | Narieda et al. | |

FOREIGN PATENT DOCUMENTS

| | | | | | |
|---|---|---|---|---|---|
| JP | 2009099282 | A | * | 5/2009 | |
| JP | 2011114158 | A | * | 6/2011 | |
| JP | 2013139640 | A | * | 7/2013 | C23C 2/02 |
| JP | 2014191998 | A | * | 10/2014 | |
| JP | 2015155560 | A | * | 8/2015 | B32B 15/01 |
| JP | 2015210942 | A | * | 11/2015 | H01R 13/03 |
| JP | 2019-057447 | A | | 4/2019 | |
| WO | WO-2018221087 | A1 | * | 12/2018 | C25D 3/62 |

* cited by examiner 5.00 μm 5.00 μm

PIN TERMINAL, CONNECTOR, WIRING HARNESS WITH CONNECTOR AND CONTROL UNIT

CROSS REFERENCE TO RELATED APPLICATIONS

This application is a national phase of PCT application No. PCT/JP2020/032929, filed on 31 Aug. 2020, which claims priority from Japanese patent application No. 2019-170928, filed on 19 Sep. 2019, all of which are incorporated herein by reference.

TECHNICAL FIELD

The present disclosure relates to a pin terminal, a connector, a wiring harness with connector and a control unit.

This application is based on Japanese Patent Application No. 2019-170928 filed with the Japan Patent Office on Sep. 19, 2019, the contents of which are hereby all incorporated by reference.

BACKGROUND

A bar-like pin terminal is used as a terminal for connecting a mating terminal and a circuit board. The pin terminal typically includes a base material made of copper alloy and a tin plating layer covering the surface of the base material as described in of the description of Patent Document 1.

Patent Document 1 discloses a plating layer, in which Sn—Pd-based alloy phases are present in an Sn parent phase and a Pd content in an outermost layer is in a specific range, as a plating layer constituting the outermost layer.

PRIOR ART DOCUMENT

Patent Document

Patent Document 1: JP 2015-094000 A

SUMMARY OF THE INVENTION

Problems to be Solved

A pin terminal of a first aspect of the present disclosure includes a bar-like base material and a plating layer covering a predetermined region of the base material, wherein a constituent material of the base material is pure copper or a copper alloy, the plating layer includes a tin-based layer made of metal containing tin, one end side of the base material includes a tip covering portion, the tin-based layer includes the tip covering portion, the tip covering portion covers an entire region in a circumferential direction on the one end side of the base material, and a difference $(t_1-t_2)$ between a maximum value $t_1$ and a minimum value $t_2$ of a thickness of the tip covering portion measured at a measurement location set at a spot of 1 mm from one end of the pin terminal along a longitudinal direction of the pin terminal is 0.20 μm or more.

A pin terminal of a second aspect of the present disclosure includes a bar-like base material and a plating layer covering a predetermined region of the base material, wherein a constituent material of the base material is pure copper or a copper alloy, the plating layer includes a tin-based layer made of metal containing tin, one end side of the base material includes a tip covering portion, the tin-based layer includes the tip covering portion, the tip covering portion covers an entire region in a circumferential direction on the one end side of the base material, and a ratio $t_2/t_1$ of a maximum value $t_1$ and a minimum value $t_2$ of a thickness of the tip covering portion measured at a measurement location set at a spot of 1 mm from one end of the pin terminal along a longitudinal direction of the pin terminal is 0.20 or more and less than 0.8.

A connector of present disclosure includes the pin terminal of the present disclosure.

A wiring harness with connector of the present disclosure includes the connector of the present disclosure and a wiring harness, the wiring harness being connected to a region on the other end side of the pin terminal.

A control unit of the present disclosure includes the connector of the present disclosure or the wiring harness with connector of the present disclosure and a circuit board, the circuit board and a region on one end side of the pin terminal being connected by solder.

DETAILED DESCRIPTION TO EXECUTE THE INVENTION

Technical Problem

Figure 1:
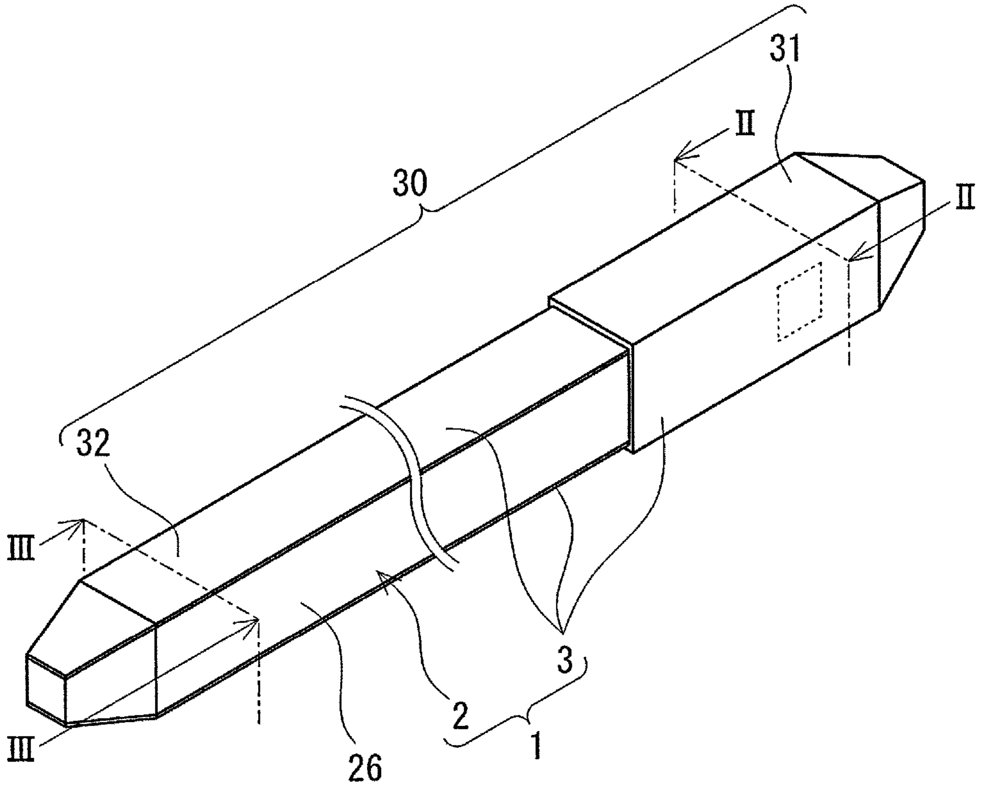
FIG. 1 is a perspective view schematically showing a pin terminal according to an embodiment.

A pin terminal is desired which is excellent in solder wettability and, in addition, excellent in insertability when being connected to a mating terminal. Further, a pin terminal is desired which is excellent also in manufacturability.

A region on one end side of the pin terminal is utilized as a region to be connected to a circuit board. A region on the other end side of the pin terminal is utilized as a region to be connected to the mating terminal.

Solder is generally utilized to connect the pin terminal and a through hole of the circuit board. Conventionally, a so-called post-plating method is utilized as described in Patent Document 1 to ensure good solder wettability. The post-plating method is a method for forming a plating layer on a base material after the base material having a predetermined shape is formed by stamping a plate material or applying a plastic processing to the plate material. In the post-plating method, the outer peripheral surface of the base material is covered with the plating layer substantially over the entire periphery. Thus, in the region on one end side of the pin terminal where solder is applied, solder is in contact with the tin plating layer without directly contacting the base material. Therefore, the pin terminal obtained by the post-plating method is excellent in solder wettability.

However, in the post-plating method, a part of the plating layer covering an end part of the base material may become locally thick, i.e. an enlarged part may be formed. If an enlarged part is present in the region on the other end side of the pin terminal, a friction force tends to increase in inserting and connecting the pin terminal to the mating terminal. If the friction force is large, a large insertion force is necessary. As a result, the insertability of the pin terminal tends to decrease.

Some of connectors used in control units, e.g. engine control units (ECUs) of automotive vehicles, may include many pin terminals. In proportion to the number of the pin terminals, the insertion force in the connector increases. Thus, the insertability of the connector tends to further decrease. Therefore, the insertion force is desired to be suppressed low.

In Patent Document 1, the insertion force can be reduced and, in addition, good solder wettability can be ensured by including the aforementioned specific outermost layer. However, if the outermost layer is formed by the post-plating method, the aforementioned enlarged part is formed. Thus, there is room for improvement in reducing the insertion force. Further, a Pd plating layer needs to be formed in the manufacturing process. Therefore, there is also room for improvement in terms of manufacturability.

Accordingly, one object of the present disclosure is to provide a pin terminal excellent in solder wettability and, in addition, excellent in insertability into a mating terminal. Another object of the present disclosure is to provide a connector, a wiring harness with connector and a control unit, which are excellent in solder wettability and, in addition, excellent in insertability into a mating terminal.

Effect of Present Disclosure

The pin terminal of the present disclosure, the connector of the present disclosure, the wiring harness with connector of the present disclosure and the control unit of the present disclosure are excellent in solder wettability and, in addition, excellent in insertability into a mating terminal.

DESCRIPTION OF EMBODIMENTS OF PRESENT DISCLOSURE

First, embodiments of the present disclosure are listed and described.

(1) A pin terminal of one aspect of the present disclosure includes a bar-like base material and a plating layer covering a predetermined region of the base material, wherein a constituent material of the base material is pure copper or a copper alloy, the plating layer includes a tin-based layer made of metal containing tin, one end side of the base material includes a tip covering portion, the tin-based layer includes the tip covering portion, the tip covering portion covers an entire region in a circumferential direction on the one end side of the base material, and a difference $(t_1-t_2)$ between a maximum value $t_1$ and a minimum value $t_2$ of a thickness of the tip covering portion measured at a measurement location set at a spot of 1 mm from one end of the pin terminal along a longitudinal direction of the pin terminal is 0.20 μm or more.

The pint terminal according to the one aspect of the present disclosure may be called a pin terminal of the first aspect of the present disclosure below.

The pin terminal of the first aspect of the present disclosure is excellent in solder wettability on the one end side of the base material. The reason for this is that the tip covering portion covering the surface on the one end side of the base material over the entire periphery can be utilized as a bonding region with solder.

Further, the pin terminal of the first aspect of the present disclosure is excellent in insertability into a mating terminal on the other end side of the base material. One of reasons for this is that the pin terminal including the tip covering portion satisfying specific thickness conditions on the one end side of the base material does not have the aforementioned enlarge part on the other end side of the base material and an insertion force in connecting a region on the other end side of the base material to the mating terminal is small.

Such a pin terminal of the first aspect of the present disclosure can be manufactured by the following manufacturing method. This manufacturing method includes not the use of the aforementioned post-plating method, but the composite use of a so-called pre-plating method and a post-plating method for plating partial regions and a specific heat treatment after post-plating. This manufacturing method may be called a multistage plating method below. The multistage plating method is described in detail later. The pre-plating method is a method for forming a base material having a predetermined shape, such as by stamping a plate with a tin-based layer after the tin-based layer is formed on the plate serving as a raw material of the base material. By performing the specific heat treatment after partial post-plating, the melting of the tin-based layer formed by the pre-plating method, particularly a layer made of pure tin, is prevented. As a result, the formation of the enlarged part is prevented.

A thickness of the tin-based layer formed by the pre-plating method substantially corresponds to the difference $(t_1-t_2)$. According to the multistage plating method, the region on the other end side of the base material includes the tin-based layer having a thickness of 0.20 μm or more in circumferential parts of the base material. Such a pin terminal of the first aspect of the present disclosure can also reduce a connection resistance with the mating terminal.

Further, the pin terminal of the first aspect of the present disclosure is also excellent in manufacturability. One of reasons for this is that the formation of a Pd plating layer is unnecessary.

In addition, according to the multistage plating method, the formation of whiskers on the surface of the tin-based layer can also be reduced by the specific heat treatment. Such a pin terminal of the first aspect of the present disclosure can prevent a short circuit between adjacent pin terminals caused by whiskers in such a usage in which many pin terminals are proximately arranged, e.g. in such a usage in which pin terminals are connected to a circuit board of one of various control units.

(2) A pin terminal of another aspect of the present disclosure includes a bar-like base material and a plating layer covering a predetermined region of the base material, wherein a constituent material of the base material is pure copper or a copper alloy, the plating layer includes a tin-based layer made of metal containing tin, one end side of the base material includes a tip covering portion, the tin-based layer includes the tip covering portion, the tip covering portion covers an entire region in a circumferential direction on the one end side of the base material, and a ratio $t_2/t_1$ of a maximum value $t_1$ and a minimum value $t_2$ of a thickness of the tip covering portion measured at a measurement location set at a spot of 1 mm from one end of the pin terminal along a longitudinal direction of the pin terminal is 0.20 or more and less than 0.8.

The pint terminal according to the other aspect of the present disclosure may be called a pin terminal of the second aspect of the present disclosure below.

The pin terminal of the second aspect of the present disclosure achieves the following effects (a) to (c) for the same reasons as the pin terminal of the first aspect of the present disclosure.

(a) Excellent in solder wettability and, in addition, excellent in insertability into the mating terminal.
(b) Excellent in manufacturability.
(c) Capable of preventing a short circuit between adjacent pin terminals caused by whiskers.

(3) As an example of the pin terminal of the second aspect of the present disclosure, a difference $(t_1-t_2)$ between the maximum value $t_1$ and the minimum value $t_2$ is 0.20 μm or more.

Since the tin-based layer having a thickness of 0.20 μm or more is provided on the other end side of the base material as described above in the above form, the connection resistance with the mating terminal can also be reduced.

(4) As an example of the pin terminal of the first aspect of the present disclosure or the pin terminal of the second aspect of the present disclosure, the tip covering portion includes an outer layer and an inner layer, a constituent material of the outer layer is pure tin, and a constituent material of the inner layer is an alloy containing tin and copper.

The above form is excellent in solder wettability due to the outer layer and can reduce the formation of whiskers by the inner layer.

(5) As an example of the pin terminal of (4) described above, the tip covering portion includes a thin film portion and a thick film portion at positions different in the circumferential direction of the base material, the thin film portion is provided in contact with the base material and has the minimum value $t_2$, and the thick film portion has the maximum value $t_1$.

The above form is excellent in solder wettability and easily reduces the formation of whiskers in the thick film portion.

(6) As an example of the pin terminal of (5) described above, the number of whiskers present on a surface of the thin film portion is 15 or less in a square visual field having one side length of 0.35 mm, and a maximum wetting force of the tip covering portion measured by a meniscograph tester is 0.25 mN or more.

The above form has a high maximum wetting force and is excellent in solder wettability. Further, the number of the whiskers is small in the thin film portion in contact with the base material in the above form. Thus, a short circuit between adjacent pin terminals caused by the whiskers can be prevented in the aforementioned usage or the like in which many pin terminals are proximately arranged. Such a form is suitable for a connector and the like including many pin terminals.

(7) As an example of the pin terminal of (5) or (6) described above, a thickness of the outer layer in the thin film portion is 0.5 μm or more, and a thickness of the inner layer in the thin film portion is 0.1 μm or more.

The above form is excellent in solder wettability due to the outer layer and can reduce the formation of whiskers by the inner layer.

(8) As an example of the pin terminal of the first aspect of the present disclosure or the pin terminal of the second aspect of the present disclosure, the constituent material of the base material is the copper alloy, and a Zn content in the copper alloy is 20% by mass or less.

In the above form, a soldering failure, specifically the formation of solder icicles to be described later, is unlikely to occur in the case of applying solder to the tip covering portion. Thus, a short circuit between adjacent pin terminals caused by the solder icicles can be prevented in the aforementioned usage or the like in which many pin terminals are proximately arranged. Such a form is suitable for a connector and the like including many pin terminals.

(9) As an example of the pin terminal of the first aspect of the present disclosure or the pin terminal of the second aspect of the present disclosure, the other end side of the base material includes a rear end covering portion and an exposed region at positions different in the circumferential direction of the base material, the tin-based layer includes the rear end covering portion, the rear end covering portion covers a partial circumferential region on the other end side of the base material, and the plating layer is not provided and the base material is exposed in the exposed region.

The above form is excellent in solder wettability and, in addition, excellent in insertable into the mating terminal by using the region on the one end side of the base material as a region to be connected to the circuit board and the region on the other end side of the base material as a region to be connected to the mating terminal. Further, the above form can reduce the connection resistance with the mating terminal by the rear end covering portion.

(10) As an example of the pin terminal of the first aspect of the present disclosure or the pin terminal of the second aspect of the present disclosure, in a cross-section of a part provided with the tip covering portion in the base material cut by a plane orthogonal to an axis of the base material, the base material has a rectangular shape, an outer peripheral surface of the base material has a first surface and a second surface arranged to face each other and a third surface and a fourth surface arranged to face each other, a part of the tip covering portion covering at least one of the first and second surfaces has the maximum value $t_1$, and a part of the tip covering portion covering at least one of the third and fourth surfaces has the minimum value $t_2$.

The above form is excellent in manufacturability since being manufacturable by the multistage plating method. Typically, the first and second surfaces are surfaces on which the plating layer by the pre-plating method is formed. The third and fourth surfaces are cut surfaces by stamping.

(11) As an example of the pin terminal of (10) described above, the plating layer includes an underlayer between parts of the tip covering portion covering the first and second surfaces and the base material, parts of the tip covering portion covering the third and fourth surfaces are provided in contact with the base material, and a constituent material of the underlayer is pure nickel or a nickel alloy.

In the above form, the formation of whiskers can be reduced more by the underlayer particularly in a relatively thick part of the tip covering portion.

(12) As an example of the pin terminal of (10) or (11) described above, in the first, second, third and fourth surfaces, a spot of 1 mm, a spot of 3 mm and a spot of 5 mm from the one end of the pin terminal along the longitudinal direction of the pin terminal are set as measurement locations for the thickness of the tip covering portion, a difference between a maximum thickness and a minimum thickness is taken at the three measurement locations, and a maximum value of the differences is 1.0 μm or less.

The above form ensures a long region where solder is applied in the longitudinal direction of the pin terminal and solder is easily applied.

(13) A connector according to one aspect of the present disclosure includes the pin terminal of (1) to (12) described above.

The connector of the present disclosure achieves the aforementioned effects (a) to (c) for the aforementioned reasons.

(14) A wiring harness with connector according to one aspect of the present disclosure includes the connector of (13) and a wiring harness, the wiring harness being connected to a region on the other end side of the pin terminal.

In the wiring harness with connector of the present disclosure, the region on the one end side of the pin terminal and the circuit board can be satisfactorily connected by solder. Further, the wiring harness with connector of the present disclosure is excellent in insertion workability since the region on the other end side of the pin terminal is easily inserted into a terminal mounted on an end part of the wiring harness, i.e. a mating terminal. Furthermore, in the wiring harness with connector of the present disclosure, a short circuit between adjacent pin terminals caused by whiskers can be prevented due to a small number of the whiskers of each pin terminal if the multistage plating method is utilized.

(15) A control unit according to one aspect of the present disclosure includes the connector of (13) described above or the wiring harness with connector of (14) described above and a circuit board, the circuit board and a region on one end side of the pin terminal being connected by solder.

In the control unit of the present disclosure, the region on the one end side of the pin terminal and the circuit board are satisfactorily connected by solder. Thus, a connection resistance between the pin terminal and the circuit board is low. Further, the control unit of the present disclosure is excellent in insertion workability since the region on the other end side of the pin terminal is easily inserted into a terminal mounted on an end part of the wiring harness, i.e. a mating terminal. Particularly, even in the case of including many pin terminals, e.g. 200 or more or 250 or more pin terminals, an insertion force at the time of connection to mating terminals is not excessively large and an inserting operation is easily performed. Furthermore, in the control unit of the present disclosure, a short circuit between adjacent pin terminals caused by whiskers can be prevented due to a small number of the whiskers of each pin terminal if the multistage plating method is utilized.

(16) As an example of the control unit of the present disclosure, the circuit board controls at least one of engine fuel injection and engine ignition.

In the above form, many pin terminals, e.g. 200 or more or 250 or more pin terminals, may be provided. Even in this case, the above form is excellent in insertability since an insertion force in connecting the pin terminals to mating terminals is not excessively large. Further, a short circuit between adjacent pin terminals caused by whiskers is unlikely to occur if the multistage plating method is utilized.

[Details of Embodiments of Present Disclosure]

Hereinafter, an embodiment of the present disclosure is described in detail with reference to the drawings. The same reference signs denote the same components in figures.

[Pin Terminal]

(Summary)

A pin terminal of this embodiment is described below mainly with reference to FIGS. 1 to 3.

Figure 4:
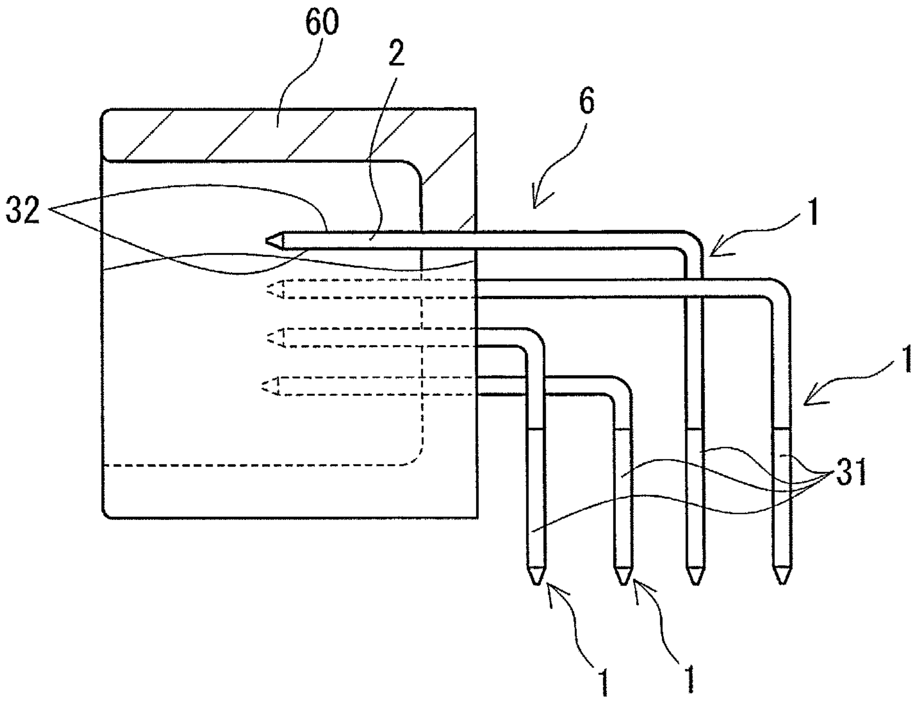
FIG. 4 is a side view schematically showing a connector according to the embodiment.
Figure 6:
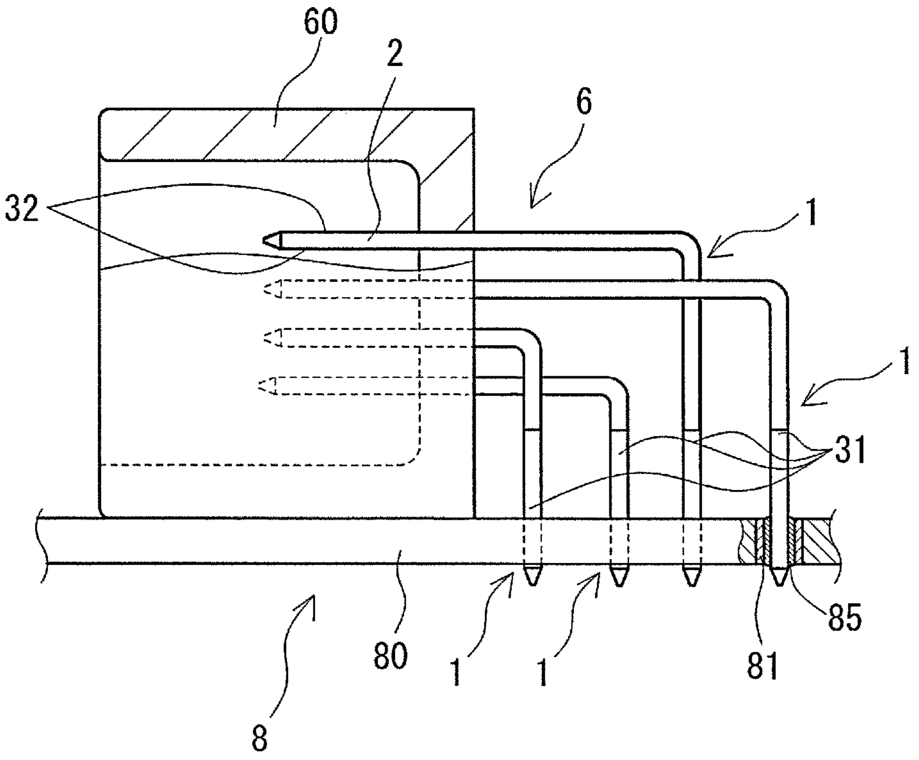
FIG. 6 is a side view schematically showing a control unit according to the embodiment.

The pin terminal 1 of this embodiment is a bar-like metal member as shown in FIG. 1. The pin terminal 1 is typically supported in a housing 60 of a connector 6 as shown in FIG. 4 to be described later and utilized as an electrical connecting member. A region on one end side of the pin terminal 1 is utilized as a connection region to a mating terminal. A region on the other end side of the pin terminal 1 is utilized as a connection region to a circuit board 80 as shown in FIG. 6 to be described later.

In particular, the pin terminal 1 includes a bar-like base material 2 and a plating layer 3. The plating layer 3 covers a predetermined region of the base material 2. A constituent material of the base material 2 is pure copper or a copper alloy. The plating layer 3 includes a tin-based layer 30 made of metal containing tin (Sn).

Particularly, in the pin terminal 1 of this embodiment, a range in which the surface of the base material 2 is covered by the tin-based layer 30 is different between a region on one end side and a region on the other end side of the base material 2. In the region on the one end side of the base material 2, the tin-based layer 30 covers the entire periphery in a circumferential direction of the base material 2 as shown in FIG. 2. In the region on the other end side of the base material 2, the tin-based layer 30 covers only parts of the base material 2, but does not cover other parts in the circumferential direction as shown in FIG. 3. In the region on the other end side of the base material 2, the parts of the base material 2 are exposed without including the plating layer 3. Hereinafter, regions exposed from the plating layer 3 in the base material 2 are called exposed regions 26.

The overall configurations of the base material 2 and the plating layer 3 are first described below. Then, the regions on the one end side and the other end side of the base material 2 are successively described.

(Base Material)

<Composition>

The base material 2, which is a main part of the pin terminal 1, is made of pure copper or a copper alloy.

Pure copper contains 99.9% by mass or more of copper (Cu) with the remainder being unavoidable impurities. The base material 2 made of pure copper has a high electrical conductivity and easily reduces a connection resistance.

The copper alloy is a most Cu-rich alloy containing additive elements with the remainder being unavoidable impurities. The additive elements are, for example, zinc (Zn), tin (Sn), phosphor (P), iron (Fe) and the like. A total content of the additive elements is, for example, 0.05% by mass or more and 40% by mass or less. The base material 2 made of copper alloy has better mechanical characteristics such as strength than the base material 2 made of pure copper.

Brasses containing Zn, copper-iron alloys containing Fe, and phosphor bronzes containing Sn and P can be cited as specific copper alloys. Copper alloys having alloy numbers C2600 and C2680 specified by JIS can be cited as the brass. A copper alloy having an alloy number C1940 can be cited as the copper-iron alloy. Copper alloys having alloy numbers C5191, C5210 and the like can be cited as the phosphor bronze.

C2600, C2680 contain Zn in a range of 28% by mass or more and 40% by mass of less.

C1940 contains 2.1% by mass or more and 2.6% by mass or less of Fe, 0.05% by mass or more and 0.20% by mass or less of Zn and 0.015% by mass or more and 0.150% by mass or less of P.

C5191, C5210 respectively contain 5.5% by mass or more and 7.0% by mass or less of Sn and 7.0% by mass or more and 9.0% by mass or less of Sn, 0.03% by mass or more and 0.35% by mass or less of P and 0.20% by mass or less of Zn.

Specific compositions of C2600, C2680 and C1940 are specified in JIS H 3100:2018. A specific composition of C5191 is specified in JIS H 3110:2018. A specific composition of C5210 is specified in JIS H 3130:2018.

If the constituent material of the base material 2 is a copper alloy, a content of Zn in the copper alloy is 20% by mass or less. C1940, C5191, C5210 described above and the like can be, for example, cited as the copper alloy having a Zn content of 20% by mass or less.

Here, the present inventors obtained the following findings. If the constituent material of the base material 2 is not a copper alloy having a Zn content of more than 20% by mass such as a brass, but a copper alloy having a Zn content of 20% by mass or less, solder icicles are unlikely to be formed in the case of applying solder to the region on the one end side of the pin terminal 1. Solder icicles are icicle-like pointed projections formed, such as by melted solder being solidified in a hanging state when soldering is performed. In such a usage in which many pin terminals 1 are proximately arranged or the like, if there is the pin terminal formed with long solder icicles, this pin terminal and the pin terminal adjacent to this pin terminal are possibly made conductive, i.e. short-circuited by the solder icicle.

Zn in the copper alloy constituting the base material 2 is thought to easily promote the formation of solder icicles. Further, as the Zn content in the copper alloy decreases, it is thought to be more difficult to form solder icicles. As a result, the aforementioned short circuit caused by the solder icicles is easily prevented. In terms of preventing a short circuit caused by solder icicles, the Zn content is preferably 15% by mass or less, more preferably 12% by mass or less or 10% by mass or less. Copper alloys having a Zn content of 1% by mass or less or 0.5% by mass or less, e.g. the aforementioned copper-iron alloys and phosphor bronzes, are preferable since solder icicles are hardly formed and mechanical strength and the like are better than pure copper. Note that pure copper substantially containing no Zn is thought to hardly form solder icicles.

<Shape>

The base material 2 typically has a rectangular parallelepiped shape. Although not shown, the base material 2 may have a locally protruding part at an appropriate position in a longitudinal direction thereof. The protruding part is utilized for positioning with respect to the housing 60 and the like. Besides, the base material 2 may have a polygonal column shape such as a hexagonal column shape or a column shape having a curved outer peripheral surface such as a cylindrical shape or an elliptical column shape.

Figure 2:
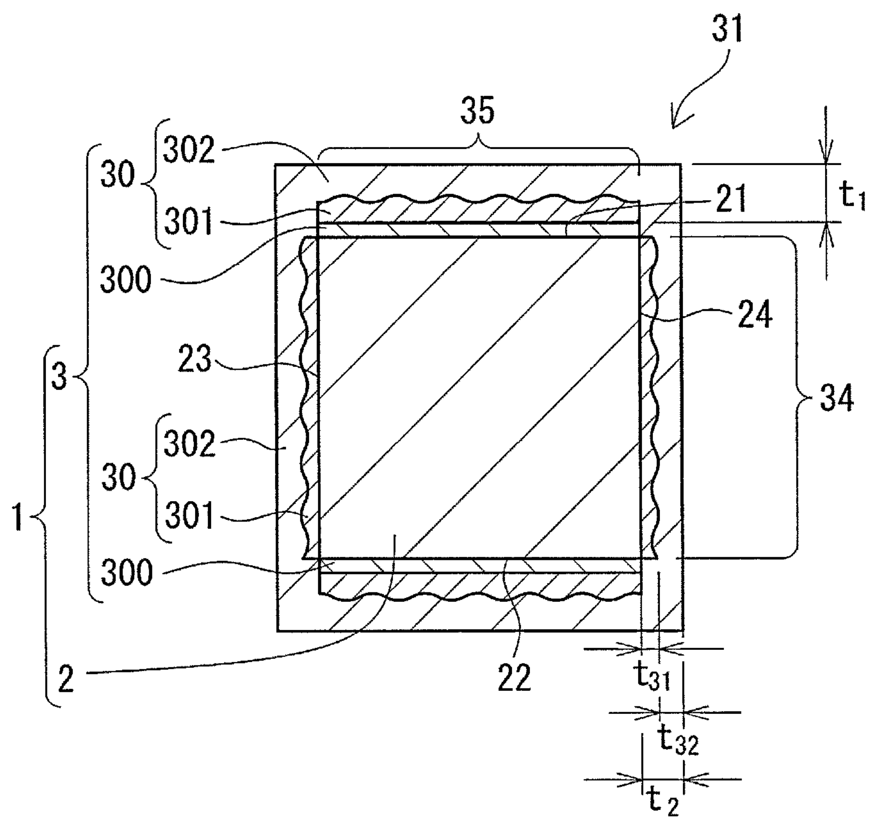
FIG. 2 is a section along II-II of FIG. 1.
Figure 3:
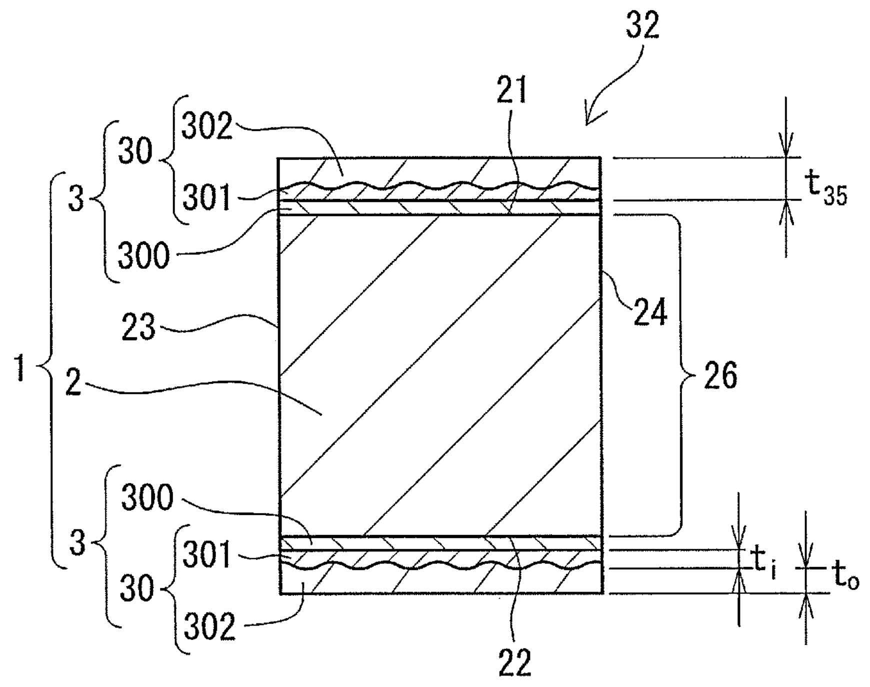
FIG. 3 is a section along of FIG. 1.

If the base material 2 has a rectangular parallelepiped shape, a cross-sectional shape of the region on each end side in the base material 2 cut by a plane orthogonal to an axis of the base material 2 is a rectangular shape as shown in FIGS. 2 and 3. The above cross-sectional shape is typically a square shape. In this case, the outer peripheral surface of the base material 2 has a first surface 21 and a second surface 22 arranged to face each other and a third surface 23 and a fourth surface 24 arranged to face each other in the above cross-section. The third and fourth surfaces 23, 24 are provided to be substantially orthogonal to the first and second surfaces 21, 22. In FIGS. 2 and 3, the first and second surfaces 21, 22 are upper and lower surfaces, and the third and fourth surfaces 23, 24 are left and right surfaces.

<Dimensions>

Dimensions such as a length, a width and a height of the base material 2 can be appropriately selected. The length of the base material 2 is a length along the axis of the base material 2. The width of the base material 2 is a length along a direction orthogonal to the axis of the base material 2 and is, for example, a length of the first surface 21 and a length of the second surface 22 in the cross-section shown in FIGS. 2 and 3. The height of the base material 2 is a length along a direction orthogonal to both the axis and a width direction of the base material 2 and is, for example, a length of the third surface 23 and a length of the fourth surface 24 in the above cross-section. Each of the width and height of the base material 2 is, for example, 0.3 mm or more and 5.0 mm or less.

(Plating Layer)

<Summary>

The predetermined region on the surface of the base material 2 is covered by the plating layer 3 including the tin-based layer 30. The one end side of the base material 2 includes a tip covering portion 31. The other end side of the base material 2 includes rear end covering portions 32. The tin-based layer 30 includes the tip covering portion 31 and the rear end covering portions 32.

The tip covering portion 31 covers the entire region in the circumferential direction on the one end side of the base material 2 as shown in FIG. 2. The tip covering portion 31 containing tin is excellent in solder wettability. The region on the one end side of the base material 2 can be satisfactorily wetted with solder over the entire periphery in the circumferential direction of the base material 2 by such a tip covering portion 31.

The rear end covering portions 32 cover partial regions in the circumferential direction on the other end side of the base material 2 as shown in FIG. 3. The rear end covering portions 32 containing tin are soft and easily deformed. A connection resistance with the mating terminal can be reduced in the region on the other end side of the base material 2 by such rear end covering portions 32.

<Composition>

The tin-based layer 30 includes an outer layer 302 and an inner layer 301 as shown in FIGS. 2 and 3. A constituent material of the outer layer 302 is pure tin. A constituent material of the inner layer 301 is an alloy containing tin and copper. The outer layer 302 is provided in contact with the outer periphery of the inner layer 301.

Pure tin contains 99% by mass or more of Sn with the remainder being unavoidable impurities. Pure tin may contain 99.8% by mass or more of Sn. Alloys containing tin and copper are typically binary alloys of Sn and Cu with the remainder being unavoidable impurities. The above alloys may contain elements such as Zn beside Sn and Cu.

The outer layer 302 made of pure tin is excellent in solderability. Thus, if the tip covering portion 31 includes the outer layer 302, the region on the one end side of the base material 2 can be satisfactorily wetted with solder. If the rear end covering portions 32 include the outer layer 302, a connection resistance with the mating terminal can be reduced.

The inner layer 301 made of the above alloy reduces the formation of whiskers on the surface of the tin-based layer 30. Thus, if the tip covering portion 31 and the rear end covering portions 32 include the inner layer 301, a short circuit between the adjacent pin terminals 1 caused by the whiskers can be prevented in such a usage in which many pin terminals 1 are proximately arranged.

The tin-based layer 30 including the inner layer 301, which is an alloy layer, and the outer layer 302, which is a pure tin layer, can be typically manufactured by applying a heat treatment after the pure tin layer is formed by one of various methods.

The plating layer 3 may include a layer other than the tin-based layer 30. For example, the plating layer 3 may include an underlayer 300 between the tin-based layer 30 and the base material 2. A constituent material of the underlayer 300 is, for example, pure nickel or a nickel alloy. The underlayer 300 made of pure nickel or nickel alloy reduces the formation of whiskers on the surface of the tin-based layer 30. The pin terminal 1 including the underlayer 300 and the tin-based layer 30 having the inner layer 301 can more effectively prevent the aforementioned short circuit caused by the whiskers. Besides, the underlayer 300 enhances the rigidity of the plating layer 3 and contributes to improving a wear resistance.

Pure nickel contains 99% by mass or more of nickel (Ni) with the remainder being unavoidable impurities. Further, pure nickel may contain 99.9% by mass or more of Ni. A nickel alloy is a most Ni-rich alloy containing additive elements with the remainder being Ni and unavoidable impurities. The additive elements are, for example, Sn, Zn, Cu and the like.

(Region on One End Side)

The region on the one end side of the base material 2 is covered by the tip covering portion 31, which is the tin-based layer 30, and the base material 2 is not exposed. The tip covering portion 31 has no uniform thickness, but a partially varying thickness in the circumferential direction of the base material 2 at a predetermined spot, e.g. at a spot of 1 mm, from one end of the pin terminal 1 along the longitudinal direction of the pin terminal 1. That is, the tip covering portion 31 includes thin film portions 34 and thick film portions 35 at positions different in the circumferential direction of the base material 2. The presence of the thin film portions 34 and the thick film portions 35 at the predetermined spot can be confirmed typically by observing a cross-section cut by a plane orthogonal to the axis of the pin terminal 1 at the predetermined spot. The thin film portion 34 is a relatively thin region of the tip covering portion 31. The thick film portion 35 is a relatively thick region of the tip covering portion 31.

<Thickness>

A thickness of the tip covering portion 31, which is the tin-based layer 30, is described in detail below.

The pin terminal 1 satisfies at least one of the following conditions (1) and (2) for a maximum value $t_1$ and a minimum value $t_2$ of the thickness of the tip covering portion 31 measured at the following measurement location.

(1) A difference $(t_1-t_2)$ of the maximum value $t_1$ and the minimum value $t_2$ is 0.20 μm or more.

(2) A ratio $t_2/t_1$ of the maximum value $t_1$ and the minimum value $t_2$ is 0.2 or more and less than 0.8.

The above measurement location is set as a spot of 1 mm from one end of the pin terminal 1 along the longitudinal direction of the pin terminal 1, out of the region of the pin terminal 1 where the tip covering portion 31 is provided. Measurement methods for the maximum value $t_1$, the minimum value $t_2$ and thicknesses $t_{31}$, $t_{32}$, $t_i$ and $t_o$ to be described later are described in detail in test examples to be described later. Note that if the tip covering portion 31 includes the inner layer 301 and the outer layer 302, the thickness of the tip covering portion 31 is the sum of the thickness of the inner layer 301 and that of the outer layer 302.

Typically, the thin film portion 34 has the minimum value $t_2$ as shown in FIG. 2. The thick film portion 35 has the maximum value $t_1$. Further, the thin film portion 34 is typically provided in contact with the base material.

The pin terminal 1 satisfying at least one of the conditions (1) and (2) is excellent in solder wettability due to the tip covering portion 31 on the one end side of the base material 2 and excellent in insertability into the mating terminal on the other end side of the base material 2. One of reasons for excellent insertability is that the rear end covering portions 32 have no locally enlarged part, preferably have a thickness uniform in the longitudinal direction of the base material 2 on the other end side of the base material 2. Here, if a multistage plating method for performing multistage plating and a specific heat treatment is utilized, the pin terminal 1 including the tin-based layer 30 having a nonuniform thickness in the circumferential direction of the base material 2 on the one end side of the base material 2 and the tin-based layer 30 having no enlarged part on the other end side of the base material 2 is obtained. That is, the pin terminal 1 satisfying at least one of the conditions (1) and (2) is obtained. Therefore, the pin terminal 1 including the tip covering portion 31 satisfying specific thickness conditions on the one end side of the base material 2 can be said to include the rear end covering portions 32 having no enlarged part on the other end side of the base material 2.

The difference $(t_1-t_2)$ may be, for example, 0.30 μm or more, 0.50 μm or more or 0.80 μm or more. If the difference $(t_1-t_2)$ is 1.0 μm or more, the pin terminal 1 easily maintains good solder wettability.

An upper limit of the difference $(t_1-t_2)$ is not particularly provided. However, as the difference $(t_1-t_2)$ increases, manufacturability tends to decrease such as due to a longer plating time by a pre-plating method. In terms of good manufacturability, the difference ($t_1-t_2$) is, for example, 5.0 μm or less, 4.5 μm or less, or 4.0 μm or less. If the difference ($t_1-t_2$) is 0.20 μm or more and 5.0 μm or less or 1.0 μm or more and 4.0 μm or less, the pin terminal 1 is excellent in solder wettability, insertability and manufacturability. Further, a connection resistance between the pin terminal 1 and the mating terminal tends to decrease.

As the ratio $t_2/t_1$ increases in the above range, the thin film portions 34 become thicker. Thus, the region on the one end side of the base material 2 can be more reliably wetted with solder by the tip covering portion 31. As the ratio $t_2/t_1$ decreases in the above range, a plating thickness by the pre-plating method is easily properly ensured. For these reasons, the ratio $t_2/t_1$ may be, for example, 0.25 or more, 0.30 or more, 0.35 or more or 0.40 or more. Further, the ratio $t_2/t_1$ may be 0.75 or less, 0.70 or less or 0.60 or less. If the ratio $t_2/t_1$ is 0.25 or more and 0.75 or less or 0.40 or more or 0.60 or less, the pin terminal 1 is excellent in solder wettability, insertability and manufacturability.

The pin terminal 1 satisfying the both conditions (1) and (2) is excellent in solder wettability due to the tip covering portion 31 on the one end side of the base material 2 and excellent in insertability into the mating terminal on the other end side of the base material 2.

Although depending on the dimensions of the base material 2, an absolute value of the maximum value $t_1$ is, for example, 1.0 μm or more and 7.0 μm or less. An absolute value of the minimum value $t_2$ is, for example, 0.8 μm or more and 4.0 μm or less. However, $t_2<t_1$.

As specific positions of the maximum value $t_1$ and the minimum value $t_2$, a part covering at least one of the first and second surfaces 21, 22 in the tip covering portion 31 has the maximum value $t_1$ if the base material 2 has the aforementioned rectangular cross-sectional shape. Further, a part covering at least one of the third and fourth surfaces 23, 24 in the tip covering portion 31 has the minimum value $t_2$.

As a more specific form, the thick film portion 35 is provided on each of the first and second surfaces 21, 22 and the thin film portion 34 is provided on each of the third and fourth surfaces 23, 24 as shown in FIG. 2. At least one thick film portion 35 has the maximum value $t_1$. At least one thin film portion 34 has the minimum value $t_2$. The tip covering portion 31 including such thin film portions 34 and thick film portions 35 is, for example, obtained if the multistage plating method is utilized. Tin-based layers by the pre-plating method and tin-based layers by the post-plating method are formed on the first and second surfaces 21, 22. That is, the thick tin-based layers are formed. These thick tin-based layers finally become the thick film portions 35. A tin-based layer by the post-plating method is formed in contact with each of the third and fourth surfaces 23, 24, which are cut surfaces by stamping. The third and fourth surfaces 23, 24 have no tin-based layer by the pre-plating method. That is, the thin tin-based layer by the post-plating method is formed in contact with each of the third and fourth surfaces 23, 24. This thin tin-based layer finally becomes the thin film portion 34.

Thicknesses of the thick film portions 35 respectively provided on the first and second surfaces 21, 22 and those of the thin film portions 34 respectively provided on the third and fourth surfaces 23, 24 are uniform along the respective surfaces as shown in FIG. 2. Uniform thicknesses along the respective surfaces mean that the following difference between a maximum thickness and a minimum thickness is less than 0.20 μm. A plurality of measurement locations are set for the tip covering portion 31 on each surface, for example, at a spot of 1 mm from one end of the pin terminal 1 along the longitudinal direction of the pin terminal 1. A difference between the maximum thickness and the minimum thickness, out of the thicknesses of the tip covering portion 31 measured at the measurement locations on each surface, is taken. If the above difference is 0.15 μm or less or 0.10 μm or less, the thick film portions 35 and the thin film portions 34 can be said to have a more uniform thickness at the above spot. If each of the thick film portions 35 and the thin film portions 34 has the uniform thickness, a solder thickness tends to be uniform.

The thickness of the thick film portion 35 on the first surface 21 and that of the thick film portion 35 on the second surface 22 are substantially equal. Further, the thickness of the thin film portion 34 on the third surface 23 and that of the thin film portion 34 on the fourth surface 24 are substantially equal. This form can be said to be a symmetrical shape respectively with respect to a bisector in the width direction of the pin terminal 1 and a bisector in the height direction of the pin terminal 1 in the cross-section shown in FIG. 2. The pin terminal 1 having the symmetrical shape is excellent in manufacturability since forming conditions and plating conditions are easily adjusted.

The thickness of the tin-based layer 30 provided on each of the first to fourth surfaces 21 to 24 varies to a small extent in the longitudinal direction of the pin terminal 1. This form easily ensures a long region of the tip covering portion 31, where solder is applied, in the longitudinal direction of the pin terminal 1. Thus, solder is easily applied in the region on the one end side of the base material 2 in this pin terminal 1.

Quantitatively, measurement locations for the thickness of the tip covering portion 31 are set at a spot of 1 mm, a spot of 3 mm and a spot of 5 mm along the longitudinal direction of the pin terminal 1 from one end of the pin terminal 1 on the first surface 21, second surface 22, third surface 23 and fourth surface 24. A difference between the maximum thickness and the minimum thickness measured at three measurement locations of each surface is taken. Out of four differences obtained for the four surfaces, a maximum value is 1.0 μm or less.

The maximum value of the difference may be 0.95 μm or less, 0.90 μm or less, 0.85 μm or less or 0.80 μm or less.

If the tip covering portion 31 includes the inner layer 301 and the outer layer 302 and the thin film portion 34 is provided in contact with the base material 2, the thickness $t_{31}$ of the inner layer 301 in the thin film portion 34 is 0.1 μm or more. Further, the thickness $t_{32}$ of the outer layer 302 in the thin film portion 34 is 0.5 μm or more.

If the thickness $t_{31}$ of the inner layer 301 is 0.1 μm or more, whiskers are unlikely to be formed on the surface of the thin film portion 34 due to the inner layer 301 even if the thin film portion 34 is provided in contact with the base material 2. If the number of the whiskers is small, preferably if substantially no whisker is present, a short circuit between adjacent pin terminals 1 caused by the whiskers is prevented. The thickness $t_{31}$ may be, for example, 0.11 μm or more or 0.15 μm or more. Further, if the thickness $t_{31}$ is 0.2 μm or more, the formation of whiskers is further reduced.

If the thickness $t_{32}$ of the outer layer 302 is 0.5 μm or more, parts provided with the thin film portions 34 in the base material 2, i.e. the third and fourth surfaces 23, 24 in FIG. 2, can be satisfactorily wetted with solder by the outer layer 302. The thickness $t_{32}$ may be, for example, 0.6 μm or more or 0.8 μm or more. Further, if the thickness $t_{32}$ is 1.0 μm or more, the parts provided with the thin film portions 34 in the base material 2 can be more satisfactorily wetted with solder.

An upper limit of the thickness $t_{31}$ of the inner layer 301 and an upper limit of the thickness $t_{32}$ of the outer layer 302 are not particularly provided. However, as the thicknesses $t_{31}$, $t_{32}$ increase, manufacturability tends to decrease such as due to a longer plating time. In terms of good manufacturability, the thickness $t_{31}$ of the inner layer 301 is, for example, 1.0 μm or less or 0.8 μm or less and the thickness $t_{32}$ of the outer layer 302 is, for example, 3.9 μm or less or 3.5 μm or less. If the thickness $t_{31}$ of the inner layer 301 is, for example, 0.1 μm or more and 1.0 μm or less or 0.15 μm or more and 0.8 μm or less, the pin terminal 1 can reduce the formation of whiskers and is excellent in manufacturability. If the thickness $t_{32}$ of the outer layer 302 is, for example, 0.5 μm or more and 3.9 μm or less or 1.0 μm or more and 3.5 μm or less, the pin terminal 1 is excellent in solder wettability and, in addition, excellent in manufacturability.

The thickness of the outer layer 302 in the thick film portion 35 is larger than the thickness $t_{32}$ of the outer layer 302 in the thin film portion 34 and is, for example, 1.0 μm or more, 1.5 μm or more or 2.0 μm or more. The thickness of the inner layer 301 in the thick film portion 35 is larger than the thickness $t_{31}$ of the inner layer 301 in the thin film portion 34 and is, for example, 0.20 μm or more, 0.25 μm or more or 0.30 μm or more.

In the case of including the underlayer 300, a thickness of the underlayer 300 is, for example, 0.3 μm or more and 4.0 μm or less or 0.5 μm or more and 2.0 μm or less.

<Structure>

The tip covering portion 31 may be provided in contact with the base material 2 over the entire periphery in the circumferential direction of the base material 2. In this case, any of the thin film portions 34 and the thick film portions 35 preferably includes the inner layer 301 and the outer layer 302. The reason for this is that the formation of whiskers on an arbitrary surface of the tip covering portion 31 can be reduced by the inner layer 301 while solder wettability is made excellent by the outer layer 302. The thickness $t_{31}$ of the inner layer 301 of the thin film portion 34 is preferably 0.1 μm or more. The reason for this is that the formation of whiskers is easily further reduced since the number of whiskers on the surface of the thin film portion 34 is small and the thickness of the inner layer 301 of the thick film portion 35 is larger than the thickness $t_{31}$ as described above.

The tip covering portion 31 may be provided in contact with the base material 2 in parts in the circumferential part of the base material 2, but not in contact with the base material 2 in other parts. The underlayer 300 may be provided in parts of the tip covering portion 31 not in contact with the base material 2. As an example, the thin film portions 34 are provided in contact with the base material 2 and the thick film portions 35 are provided in contact with the underlayer 300 without contacting the base material 2. As described above, if the thickness $t_{31}$ of the inner layer 301 of the thin film portion 34 is 0.1 μm or more, the number of whiskers on the surface of the thin film portion 34 can be reduced. The thick film portion 35 easily further reduces the formation of whiskers by the underlayer 300 in addition to the relatively thick inner layer 301. This form can be manufactured by forming the tin-based layer after the underlayer 300 made of pure nickel or nickel alloy is formed by the pre-plating method in the case of utilizing the multistage plating method.

More specifically, if the cross-sectional shape of the base material 2 is the rectangular shape as described above, the plating layer 3 includes the underlayer 300 between parts of the tip covering portion 31 covering the first and second surfaces 21, 22 and the base material 2, and these parts are the thick film portions 35. Further, the parts of the plating layer 3 covering the third and fourth surfaces 23, 24 of the tip covering portion 31 are provided in contact with the base material 2, and these parts are the thin film portions 34. That is, the first and second surfaces 21, 22 successively include the underlayer 300 and the thick film portion 35. The third and fourth surfaces 23, 24 include the thin film portion 34, but does not include the underlayer 300.

The tip covering portion 31 may be provided not to contact the base material 2 over the entire periphery in the circumferential direction of the base material 2. That is, the underlayer 300 is provided over the entire periphery in the circumferential direction of the base material 2 and the tip covering portion 31 is provided on this underlayer 300. In this case, the formation of whiskers is reduced by the underlayer 300 on an arbitrary surface of the tip covering portion 31. However, in the case of manufacturing this form utilizing the multistage plating method, masking is necessary and manufacturability is reduced. In particular, stamping is performed after the underlayer 300 and the tin-based layer are formed by the pre-plating method. Subsequently, the underlayer 300 is formed after a circumferential part of the base material 2 is masked. Thereafter, masking is removed and the tin-based layer 30 is formed to cover the base material 2 over the entire periphery. In terms of good manufacturability, the underlayer 300 is preferably provided in the circumferential part of the base material 2.

<Whiskers>

The tip covering portion 31 desirably has fewer whiskers. The whiskers here are projections made of tin and are relatively long projections specified in JIS C 60068-2-82: 2009, e.g. needle-like projections having a length of 10 μm or more.

Particularly, if the thin film portions, which are relatively thin parts in the tip covering portion 31, are in contact with the base material 2 containing copper, whiskers are more easily formed on the thin film portions 34 than on the thick film portions 35. This is because the thickness $t_{31}$ of the inner layer 301 provided in the thin film portion 34 tends to be smaller than the thickness of the inner layer 301 provided in the thick film portion 35 as described above. Quantitatively, the number of whiskers present on the thin film portion 34 is 15 or less in the following visual field. This visual field is a square region having one side length of 0.35 mm A method for measuring the number of whiskers is described in test examples to be described later.

The number of the whiskers on the thin film portion 34 is small if the number of the whiskers is 15 or less in the region of 0.35 mm×0.35 mm. Thus, in such a usage in which many pin terminals 1 are proximately arranged or the like, a short circuit between adjacent pin terminals 1 caused by the whiskers is prevented. As the number of the whiskers decreases, the above short circuit can be more reliably prevented. In terms of preventing the short circuit, the number of the whiskers is preferably 10 or less, 5 or less or 3 or less in the above region, and more preferably zero, i.e. the absence of the whisker. Note that the projections made of tin include spherical projections called nodules, i.e. relatively short projections. If the number of the whiskers, which are relatively long projections described above, is small, preferably if the whiskers are absent although nodules are present, the short circuit is unlikely to occur.

The pin terminal 1 in which the number of the whiskers is 15 or less in the above region is typically such that the thickness $t_{31}$ of the inner layer 301 provided in the thin film portion 34 is 0.1 μm or more. Such a pin terminal 1 can be manufactured, for example, by the multistage plating method.

<Wetting Force>

The tip covering portion 31 is excellent in solder wettability. Quantitatively, a maximum wetting force of the tip covering portion 31 measured by a meniscograph tester is 0.25 mN or more. A method for measuring the maximum wetting force is described in test examples to be described later.

If the maximum wetting force is 0.25 mN or more, the region on the one end side of the base material 2 can be satisfactorily wetted with solder by the tip covering portion 31 and is excellent in solder wettability. As the maximum wetting force increases, solder wettability becomes more excellent. In terms of good solder wettability, the maximum wetting force is 0.26 mN or more, preferably 0.28 mN or more and more preferably 0.30 mN or more.

An upper limit of the maximum wetting force is not particularly provided.

The pin terminal 1 having a maximum wetting force of 0.25 mN or more typically includes the outer layer 302 over the entire periphery in the circumferential direction of the base material 2 in the region on the one end side of the base material 2, and the thickness $t_{32}$ of the outer layer 302 provided in the thin film portion 34 is 0.5 μm or more. Such a pin terminal 1 can be manufactured, for example, by the multistage plating method.

(Region on Other End Side)

The other end side of the base material 2 includes the rear end covering portions 32 and the exposed regions 26. The rear end covering portions 32 and the exposed regions 26 are provided at positions different in the circumferential direction of the base material 2. In the exposed regions 26, the plating layer 3 is not provided and the base material 2 is exposed.

The rear end covering portions 32 are continuous with the tip covering portion 31 and integrally constitutes the tin-based layer 30. However, a thickness $t_{35}$ of the rear end covering portions 32 and the thickness of the thick film portions 35 of the tip covering portion 31, typically, the maximum value $t_1$, are different in many cases. The tin-based layer 30 has a step in the longitudinal direction of the base material 2 due to this thickness difference.

If the cross-sectional shape of the base material 2 is the aforementioned rectangular shape, the specific positions of the rear end covering portions 32 and the exposed regions 26 are as follows. As shown in FIG. 3, the rear end covering portions 32 are provided on the first and second surfaces 21, 22 and the third and fourth surfaces 23, 24 are the exposed regions 26. In this form, the thick film portions 35 of the tip covering portion 31 are provided on the region on the one end side of the base material and the rear end covering portions 32 are provided on the other end side of the base material 22 on the first and second surfaces 21, 22. Further, in this form, the thin film portions 34 are provided in the region on the one end side and the base material 2 is exposed in the region on the other end side of the base material 2 on the third and fourth surfaces 23, 24.

The thickness of the rear end covering portion 32 provided on each of the first and second surfaces 21, 22 is uniform in the longitudinal direction of the base material 2. The uniform thickness in the longitudinal direction means that a maximum value of the following difference between a maximum thickness and a minimum thickness is less than 0.20 μm. Out of the region of the pin terminal 1 where the rear end covering portion 32 is provided, measurement locations for the thickness of the rear end covering portion 32 are set at a spot of 1 mm, a spot of 3 mm and a spot of 5 mm from the other end of the pin terminal 1 along the longitudinal direction of the pin terminal 1. A difference between the maximum thickness and the minimum thickness measured at three measurement locations of each surface is taken. Out of two differences obtained for two surfaces, a maximum value is taken. If this maximum value is 0.15 μm or less or 0.1 μm or less, the rear end covering portion 32 can be said to have a more uniform thickness. If the rear end covering portions 32 have the uniform thickness in the longitudinal direction, this pin terminal 1 does not have the aforementioned enlarged part and the region on the other end side of the base material 2 is easily inserted into the mating terminal.

The thickness of the rear end covering portion 32 provided on each of the first and second surfaces 21, 22 is uniform along each surface as shown in FIG. 3. The uniform thickness along each surface means that the following difference between a maximum thickness and a minimum thickness is less than 0.20 μm. A plurality of measurement locations are set, for example, at a spot of 1 mm from the other end of the pin terminal along the longitudinal direction of the pin terminal 1 for the rear end covering portion 32 on each surface. A difference between the maximum thickness and the minimum thickness, out of the thicknesses of the rear end covering portion 32 measured at three measurement locations of each surface, is taken. If this difference is 0.15 μm or less or 0.10 μm or less, the rear end covering portion 32 can be said to have a more uniform thickness at the above spot. If the rear end covering portion 32 has the uniform thickness, a contact area with the mating terminal is easily properly ensured and a connection resistance tends to decrease.

The thickness of the rear end covering portion 32 on the first surface 21 and the thickness of the rear end covering portion 32 on the second surface 22 are substantially equal. This form can be said to be a symmetrical shape respectively with respect to a bisector in the width direction of the pin terminal 1 and a bisector in the height direction of the pin terminal 1 in the cross-section shown in FIG. 3. The pin terminal 1 having the symmetrical shape is excellent in manufacturability since forming conditions and plating conditions are easily adjusted.

In the case of utilizing the multistage plating method, the rear end covering portions 32 are formed by the tin-based layer formed by the pre-plating method. A thickness of this tin-based layer corresponds to the difference $(t_1-t_2)$ in the tip covering portion 31 as described above. If the thickness $t_{35}$ of the rear end covering portions 32 is equal to or larger than the difference $(t_1-t_2)$, the contact area with the mating terminal is easily properly ensured and the connection resistance tends to decrease.

A specific thickness of the rear end covering portion 32 is smaller than the thickness of the thick film portion 35 of the tip covering portion 31, typically the maximum value $t_1$. Further, if the rear end covering portion 32 includes the inner layer 301 and the outer layer 302, a thickness $t_i$ of the inner layer 301 of the rear end covering portion 32 is larger than the thickness $t_{31}$ of the inner layer 301 of the thin film portion 34 and smaller than the thickness of the inner layer 301 of the thick film portion 35. Further, in this case, a thickness $t_o$ of the outer layer 302 of the rear end covering portion 32 is larger than the thickness $t_{32}$ of the outer layer 302 of the thin film portion 34 and smaller than the thickness of the outer layer 302 of the thick film portion 35. Such a pin terminal 1 can be manufactured, for example, by the multistage plating method.

[Connector]

The connector 6 of the embodiment is described below mainly with reference to FIG. 4.

The connector 6 of the embodiment includes the pin terminals 1 of the embodiment. Typically, the connector 6 includes the plurality of pin terminals 1 and the housing 60. Each pin terminal 1 is held in the housing 60 while being bent into an L shape.

The housing 60 is a molded body made of electrically insulating material such as resin. The housing 60 includes a bottom part and a peripheral wall part. The bottom part is provided with a plurality of unillustrated through holes in an aligned state. The respective pin terminals 1 are press-fit into the respective through holes, whereby the bottom part holds the respective pin terminals 1. The respective pin terminals 1 held in the bottom part are arranged at predetermined intervals in a vertical direction of FIG. 4 and a direction perpendicular to the plane of FIG. 4. The peripheral wall part stands from the peripheral edge of the bottom part and is annularly continuous. A mating connector including mating terminals, e.g. a connector 76 shown in FIG. 5 to be described later, is inserted into an internal space surrounded by the bottom part and the peripheral wall part. Note that the housing 60 is shown partly in section in FIG. 4 and FIG. 6 to be described later.

In each pin terminal 1, the region on the one end side including the tip covering portion 31 is exposed outside the housing 60. In each pin terminal 1, the region on the other end side including the rear end covering portions 32 is arranged in the internal space of the housing 60. Each pin terminal 1 is so held in the housing 60 that the parts of the base material 2 where the rear end covering portions 32 are provided, e.g. the first and second surfaces 21, 22 are arranged on an upper side and a lower side in FIG. 4. If the connector 76 is inserted, the rear end covering portions 32 contact the mating terminals, which are female terminals, to be electrically connected.

The number of the pin terminals 1 in the connector 6, the arranged positions of the pin terminals 1 in the bottom part of the housing 60, the shape of the housing 60, a constituent material of the housing 60 and the like can be appropriately selected.

[Wiring Harness with Connector]

The wiring harness with connector 7 of the embodiment is described below mainly with reference to FIG. 5.

The wiring harness with connector 7 of the embodiment includes the connector 6 of the embodiment and a wiring harness 70. The wiring harness 70 is connected to the regions on the other end sides of the pin terminals 1 where the rear end covering portions 32 are provided. The region on the one end side of the pin terminal 1 where the tip covering portion 31 is provided is connected to the circuit board 80. One end of the wiring harness 70 is electrically connected to the circuit board 80 by the connector 6. The other end of the wiring harness 70 is electrically connected to an unillustrated electronic device controlled by the circuit board 80.

The wiring harness 70 includes one or more wires 71 and connectors 74, 75 to be mounted on end parts of the wire(s) 71. The wire 71 includes a conductor and an electrically insulating layer. The conductor is typically made of a conductive material such as copper, aluminum and alloys of these. The electrically insulating layer is made of an electrically insulating material such as resin and covers the outer periphery of the conductor. Appropriate male and female connectors can be utilized as the connectors 74, 75.

Figure 5:
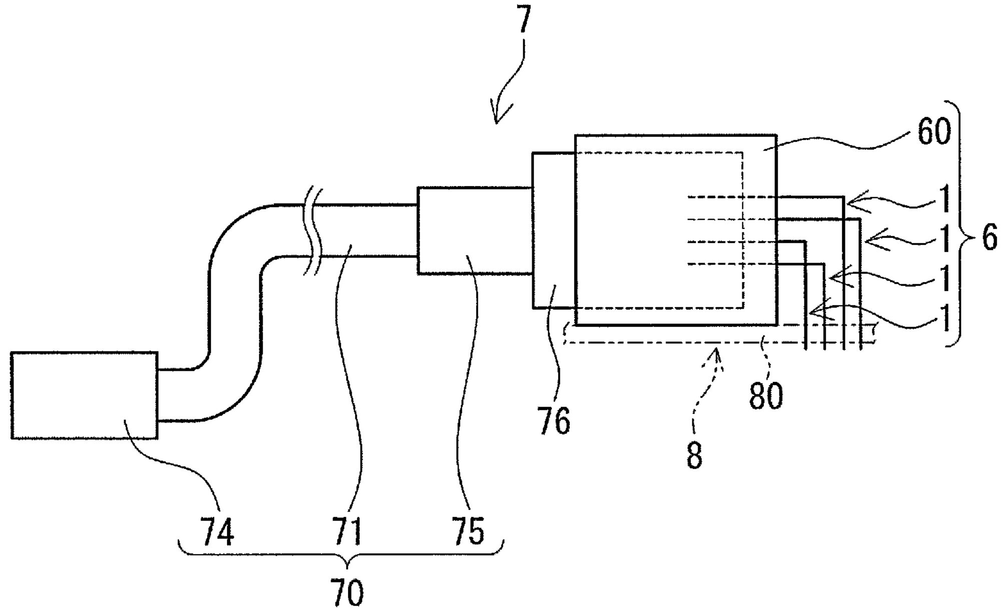
FIG. 5 is a side view schematically showing a wiring harness with connector according to the embodiment.

The wiring harness with connector 7 may include another connector 76 between the connector 75 of the wiring harness 70 and the connector 6 of the embodiment as illustrated in FIG. 5. For example, the connector 75 is a male connector and the connector 76 is a female connector.

[Control Unit]

The control unit 8 of the embodiment is described below mainly with reference to FIG. 6.

The control unit 8 of the embodiment includes the connector 6 of the embodiment or the wiring harness with connector 7 of the embodiment and the circuit board 80. The regions of the pin terminals 1 on the one end side where the tip covering portions 31 are provided and the circuit board 80 are connected by solder 85. The control unit 8 shown in FIG. 6 includes the connector 6 of the embodiment. Reference may be made to two-dot chain lines of FIG. 5 for the control unit 8 including the wiring harness with connector 7 of the embodiment.

The circuit board 80 includes a plurality of through holes 81. The region on the one end side of each pin terminal 1 is inserted into each through hole 81. This region on the one end side of the pin terminal 1 and the through hole 81 are made conductive by the solder 85. Note that the circuit board 80 is shown partly in section in FIG. 6. Further, FIG. 6 shows only a cross-section of one through hole 81 as a representative.

The circuit board 80 controls the electronic device connected on the side of the connector 74 of the wiring harness 70 by the wiring harness 70 connected to the regions on the other end sides of the pin terminals 1. The circuit board 80 is stored in an unillustrated case.

The circuit board 80 controls, for example, at least one of engine fuel injection and engine ignition. The control unit 8 including such a circuit board 80 is called an engine control unit. The engine control unit may include many pin terminals 1, e.g. 200 or more or 250 or more pin terminals 1. The control unit 8 other than the engine control unit may also include many pin terminals 1.

(Main Effects)

The pin terminal 1 of the embodiment is excellent in solder wettability and, in addition, excellent in insertability into the mating terminal. Particularly, in such a usage in which many pin terminals 1 described above are provided, it is suppressed that an insertion force at the time of connection to the mating terminals becomes excessively large. Further, the pin terminal 1 of the embodiment can be manufactured with good productivity if being manufactured by the multistage plating method. Further, the pin terminal 1 has a small number of whiskers on the tip covering portion 31. Thus, it is possible to prevent a short circuit between adjacent pin terminals 1 caused by the whiskers in the aforementioned usage.

Since the connector 6 of the embodiment, the wiring harness with connector 7 of the embodiment and the control unit 8 of the embodiment are excellent in solder wettability and, in addition, excellent in insertability into the mating terminals since including the pin terminals 1 of the embodiment. Particularly, if the connector 6 includes many pin terminals 1, e.g. 200 or more or 250 or more pin terminals 1, it is suppressed that an insertion force at the time of connection to the mating terminals becomes excessively large, wherefore connection workability is excellent. Further, even when the connector 6 includes many pin terminals 1, a short circuit between adjacent pin terminals 1 caused by the whiskers is prevented.

(Pin Terminal Manufacturing Method)

Figure 7:
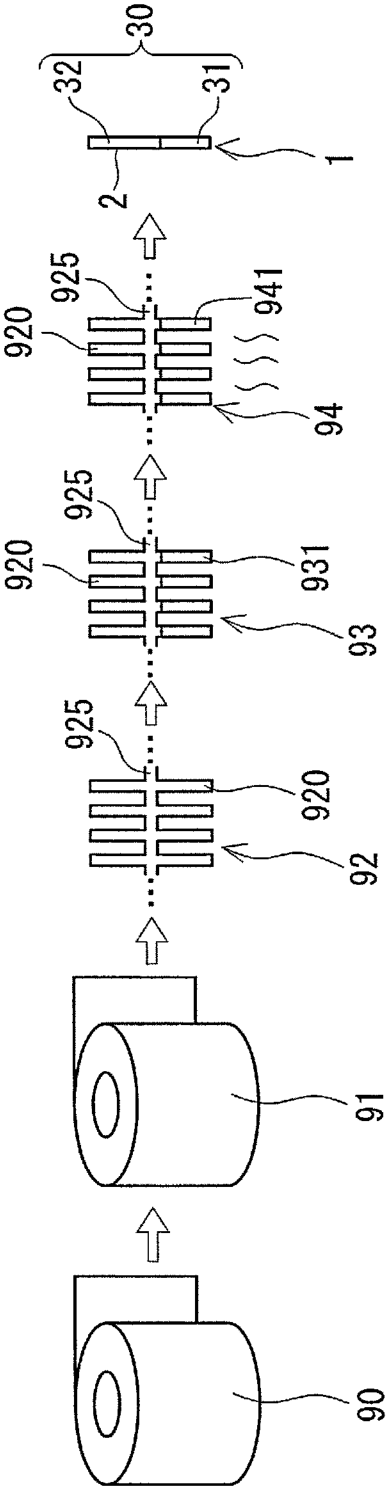
FIG. 7 is a process diagram showing a pin terminal manufacturing method.

An example of a pin terminal manufacturing method is described below with appropriate reference to FIG. 7.

The pin terminal 1 of the embodiment is, for example, manufactured as follows. First, a plated base material is formed by the so-called pre-plating method. A tin-based layer is formed by plating only in a region on one end side of the obtained plated base material. The tin-based layer is not formed in a region on the other end side of the base material. A heat treatment is applied under specific conditions after this plating.

The above manufacturing method, i.e. the multistage plating method, is based on the following findings.

In the pre-plating method, a thickness of the tin-based layer tends to be uniform. However, cut surfaces by stamping are formed in a formed body obtained by the pre-plating method. The cut surfaces are surfaces where the base material is exposed and do not have the tin-based layer. The above formed body is poor in solder wettability due to these exposed parts of the base material.

If a tin-based layer is further formed, for example, to cover only the region on the one end side of the base material including the cut surfaces, out of the above formed body, solder wettability is enhanced. However, whiskers are easily formed on the surface of the tin plating layer provided right on the base material.

For example, if a reflow process is applied after second plating applied to the above formed body, the formation of whiskers is reduced. However, the tin-based layer, particularly pure tin layer, by the pre-plating method present on the other end side of the base material is melted by the reflow process.

Here, conventionally, the reflow process after tin plating is performed at a temperature exceeding a melting point of tin, e.g. about 300° C. to 400° C., as described in Patent Document 1. By the melting of the pure tin layer, locally thick parts, e.g. enlarged parts, are formed on the tin-based layer on the other end side of the base material, thereby reducing insertability into the mating terminal.

On the other hand, if a heat treatment is applied under specific conditions after the second plating, the number of whiskers is effectively reduced while the formation of the enlarged parts is reduced by preventing the above melting on each end part of the base material.

The multistage plating method includes, for example, the following processes.

<Forming Process>

A plated plate 91 is stamped into a predetermined shape to fabricate a forming material 92 in which a plurality of bar-like portions 920 are arranged in parallel. The plated plate 91 includes a tin-based layer made of metal containing tin.

<Secondary Plating Process>

A secondary plating layer 931 is formed in a region on one end side of each bar-like portion 920. The secondary plating layer 931 includes a pure tin layer made of pure tin.

<Heat Treatment Process>

A heat treatment is applied to a partially plated material 93 including the secondary plating layers 931.

A heat treatment temperature is below the melting point of tin. The melting point of tin is about 232° C.

Each process of the multistage plating method is described below.

<Forming Process>

The forming process is a process of fabricating the forming material 92 by the so-called pre-plating method.

<<Plated Plate>>

The plated plate 91 used in the forming process includes a material plate 90 and unillustrated primary plating layers. FIG. 7 shows elongated plate materials wound like a coil as the material plate 90 and the plated plate 91.

A constituent material of the material plate 90 is pure copper or a copper alloy. Reference may be made to the above section of (Base Material) <Composition> for the details of pure copper and copper alloys.

The primary plating layers are provided on both sides of the material plate 90. The primary plating layer may include only a tin-based layer or may include a plating layer other than the tin-based layer. The tin-based layer may include only a pure tin layer or may include a pure tin layer and an alloy layer. The alloy layer is made of alloy containing tin and copper. Note that a part of the pure tin layer can change to an alloy layer by the heat treatment to be described later. The plating layer other than the tin-based layer is, for example, an underlayer 300 provided between the tin-based layer and the material plate 90. Reference may be made to the above section of (Plating Layer) <Composition> for the details of the underlayer 300.

A thickness of the tin-based layer in the primary plating layer substantially corresponds to the above difference ($t_1-t_2$). Thus, the thickness of the tin-based layer in the primary plating layer is so adjusted that the difference ($t_1-t_2$) is in a predetermined range. The thickness of the tin-based layer in the primary plating layer is, for example, 0.20 μm or more and 5.0 μm or less.

If the primary plating layer includes the underlayer 300, primary plating conditions are so adjusted that the thickness of the underlayer 300 is, for example, in the above predetermined range.

The plated plate 91 is manufactured by a known manufacturing method. The primary plating layer is formed by various plating methods, typically by an electroplating method.

<<Forming Material>>

The forming material 92 includes the plurality of bar-like portions 920 and a coupling portion 925.

The plurality of bar-like portions 920 are so arranged in parallel at predetermined intervals that axes of the respective bar-like portions 920 are parallel. The material plate 90 is exposed at a part of each bar-like portion 920 facing the adjacent bar-like portion 920 except at a part where the coupling portion 925 is formed. Both sides of each bar-like portion 920 include the primary plating layers. Typically, a cross-sectional shape of each bar-like portion 920 cut by a plane orthogonal to the axis of each bar-like portion 920 is the rectangular shape shown in FIGS. 2 and 3.

The coupling portion 925 connects the adjacent bar-like portions 920. Typically, the coupling portion 925 is provided at or near longitudinal center positions of the bar-like portions 920.

The forming material 92 is manufactured by a known press-forming method. If the above cross-sectional shape is a rectangular shape, the forming material 92 can be easily formed by stamping.

<Secondary Plating Process>

The secondary plating process is a process of forming the secondary plating layers 931 by partially plating the forming material 92 by the pre-plating method, i.e. a process of performing a partial post-plating method.

In particular, the secondary plating layer 931 is formed in the region on the one end side of each bar-like portion 920 in the forming material 92. The secondary plating layer 931 is not formed in the region on the other end side of each bar-like portion 920. Thus, a region where the material plate 90 is exposed and a region provided with the primary plating layer are present at different positions in a circumferential direction of each bar-like portion 920 in the region on the other end side of each bar-like portion 920.

The secondary plating layer 931 is formed to cover the entire periphery in the circumferential direction of each bar-like portion 920 in the region on the one end side of each bar-like portion 920. As a result, the secondary plating layer 931 has first covering parts provided in contact with the regions where the material plate 90 is exposed and second covering parts provided in contact with not the material plate 90, but the primary plating layer in the region on the one end side of each bar-like portion 920. The first and second covering parts are present at different positions in the circumferential direction of each bar-like portion 920.

The first covering parts finally constitute the aforementioned thin film portions 34. Since the first covering part includes the secondary plating layer 931, but does not include the primary plating layer, the first covering part tends to have the aforementioned minimum value $t_2$.

The second covering parts finally constitute the aforementioned thick film portions 35. Since the second covering part includes the tin-based layer of the primary plating layer and the pure tin layer in the secondary plating layer 931, the second covering part tends to have the aforementioned maximum value $t_1$.

A thickness of the pure tin layer in the secondary plating layer 931 typically corresponds to the aforementioned minimum value $t_2$. Thus, the thickness of the pure tin layer in the secondary plating layer 931 is so adjusted that the minimum value $t_2$ is in a predetermined range. The thickness of the pure tin layer in the secondary plating layer 931 is, for example, 0.8 μm or more and 4.0 μm or less.

The secondary plating layer 931 is formed by various plating methods, typically by an electroplating method. Pretreatments such as degreasing and acid cleaning are performed before the secondary plating layer 931 is formed.

<Heat Treatment Process>

The heat treatment process is a process of performing a heat treatment to alloy parts of the pure tin layers in the secondary plating layers 931 present in the region on the one end side of the partially plated material 93. By forming a layer made of alloy containing tin and copper by alloying, the formation of whiskers on the surface of the tin-based layer 30 can be reduced. Particularly, in this heat treatment process, a heat treatment temperature is set equal to or lower than the melting point of tin so that the pure tin layer in the primary plating layer present in the region on the other end side of the partially plated material 93 is hardly melted.

Quantitatively, the heat treatment temperature is below 230° C. As the heat treatment temperature decreases, the above melting is more easily prevented. Further, after the heat treatment, the layer made of pure tin tends to remain thick. As a result, the tin-based layer 30 excellent in solder wettability is obtained. As the heat treatment temperature increases, the alloying is promoted and the layer made of the alloy tends to become thick. As a result, the formation of whiskers on the tin-based layer 30 is easily reduced. In terms of preventing the melting and obtaining good solder wettability, the heat treatment temperature is preferably 225° C. or lower or 220° C. or lower. In terms of reducing the formation of whiskers, the heat treatment temperature is preferably 150° or higher, more preferably above 180° C., 190° C. or higher or 200° C. or higher.

A heat treatment temperature holding time can be appropriately selected according to the size and the like of the bar-like portions 920. For example, the holding time is 5 sec or more and 60 sec or less. After the elapse of the predetermined holding time, heating is stopped and the heat treatment process is finished.

A heat treated material 94 obtained by the heat treatment process includes a heat treated layer 941 formed from the secondary plating layer 931 in the region on the one end side of each bar-like portion 920. The heat treated layer 941 includes a layer made of the above alloy and a layer made of pure tin provided in contact with this alloy layer. That is, the heat treated layer 941 corresponds to the tin-based layer 30 including the aforementioned inner layer 301 and outer layer 302. The above alloy layer is at least partially provided in contact with the material plate 90.

<Other Processes>

The pin terminals 1 of the embodiment are obtained by cutting the coupling portion 925 from the heat treated material 94 to cut off the adjacent bar-like portions 920. The heat treated layer 941 on the one end side of the bar-like portion 920 constitutes the tip covering portion 31. The tin-based layer constitutes the rear end covering portions 32 and the regions where the material plate 90 is exposed constitute the exposed regions 26 shown in FIG. 3 in the region on the other end side of the bar-like portion 920.

Test Example 1

Pin terminals including a tin-based layer at least partially covering the surface of a base material were fabricated under various manufacturing conditions and the thicknesses, the solder wettability, the number of tin projections and the quality of soldering of the tin-based layers were examined (Specimens No. 1 to No. 7, No. 50)

The pin terminals of specimens No. 1 to No. 7 and No. 50 are specimens manufactured using the aforementioned multistage plating method. Three or more samples were prepared for each specimen.

A manufacturing process is outlined. A plated plate formed with a primary plating layer is stamped into a predetermined shape to fabricate a forming material including a plurality of bar-like portions and a coupling portion. In the forming material, a secondary plating layer is formed to cover the entire periphery in a circumferential direction of each bar-like portion in a region on one end side of each of the bar-like portions arranged in parallel. After secondary plating, a heat treatment is applied to the specimens except the specimen No. 1. After the heat treatment, the coupling portion connecting the adjacent bar-like portions is cut, whereby the pin terminals are obtained. The coupling portion of the specimen No. 1 was cut after secondary plating without applying the heat treatment.

The plated plate includes tin-based layers on both sides of a copper alloy plate and includes no layer other than the tin-based layers such as an underlayer. The tin-based layer includes an alloy layer containing tin and copper on the side of the copper alloy plate and includes a pure tin layer on the alloy layer.

Plates made of brass having an alloy number C2600 of JIS and plates made of phosphor bronze having an alloy number C1940 of JIS were prepared as the copper alloy plates.

The copper alloy plates having a thickness of 0.5 mm, 0.64 mm, 1.0 mm and 2.8 mm were prepared.

A secondary plating layer is a pure tin layer and includes no layer other than the pure tin layer such as an underlayer.

The pin terminal of each specimen includes a bar-like base material and a tin-based layer covering a predetermined region of the base material, and the base material is partially exposed. The base material has a square cross-sectional shape in a cross-section obtained by cutting a region on each end side of each pin terminal by a plane orthogonal to a longitudinal direction of the base material. Here, the following four types of pin terminals having different one side lengths in the above square cross-sections were fabricated.

The pin terminal having the one side length of 0.5 mm is called of a 0.5 type.

The pin terminal having the one side length of 0.64 mm is called of a 0.64 type.

The pin terminal having the one side length of 1.0 mm is called of a 1.0 type.

The pin terminal having the one side length of 2.8 mm is called of a 2.8 type.

The pin terminal of the 0.5 type was manufactured using the copper alloy plate having a thickness of 0.5 mm.

The pin terminal of the 0.64 type was manufactured using the copper alloy plate having a thickness of 0.64 mm.

The pin terminal of the 1.0 type was manufactured using the copper alloy plate having a thickness of 1.0 mm.

The pin terminal of the 2.8 type was manufactured using the copper alloy plate having a thickness of 2.8 mm.

In the aforementioned cross-section, the outer peripheral surface of the base material has a first surface, a second surface, a third surface and a fourth surface constituting each surface of the square.

The first surface is a surface, against which a punch is pressed during stamping, and is a so-called dull surface.

The second surface is a surface facing the first surface and is a so-called burr surface.

The third and fourth surfaces are surfaces facing each other and orthogonal to the first and second surfaces. The third and fourth surfaces are cut surfaces formed by stamping.

In each of the pin terminals of the specimens No. 1 to No. 7 and No. 50, the tin-based layer covering the entire base material in the circumferential direction, here the first to fourth surfaces, is provided in the region on the one end side of the base material. The base material is not exposed on the one end side of the base material. The tin-based layer covering circumferential parts of the base material, here the first and second surfaces, is provided in the region on the other end side of the base material. The other circumferential parts of the base material, here the third and fourth surfaces, are exposed without including the plating layer including the tin-based layer. Any of the tin-based layer on the one end side of the base material and the tin-based layer on the other end side includes an outer layer made of pure tin and an inner layer made of alloy containing tin and copper.

<Terminal Size and Composition of Base Material>

The specimens No. 1 to No. 4 and No. 50 were pin terminals of the 0.64 type, and fabricated using a plated plate including a phosphor bronze plate as the copper alloy plate. That is, any of the base materials of the specimens No. 1 to No. 4 and No. 50 was made of phosphor bronze having a Zn content of 20% by mass or less in the copper alloy.

The specimens No. 5 to No. 7 were successively pin terminals of the 0.5 type, 1.0 type and 2.8 type and fabricated using a plated plate including a brass plate as the copper alloy plate.

A specimen similar to the specimen No. 3 except that the copper alloy plate was a brass plate was prepared as a specimen No. 3-1.

Any of the base materials of the specimens No. 5 to No. 7 and No. 3-1 was made of brass having a Zn content of more than 20% in the copper alloy.

<Heat Treatment Conditions>

The heat treatment was not performed after secondary plating for the specimen No. 1 and "–" is written in a table.

The heat treatment temperatures after second plating are different for the specimens No. 2 to No. 4 and No. 50 and successively 200° C., 210° C., 220° C. and 240° C.

The heat treatment temperatures of the specimens No. 5 to No. 7 are 210° C.

The heat treatment temperature holding time is 30 sec for any of the specimens.

(Specimen No. 101)

A pin terminal of a specimen No. 101 is a specimen in which a tin-based layer is provided by the so-called post-plating method. This pin terminal includes the tin-based layer covering the entire surface of a base material from one end to the other end of the base material. The base material is not exposed in this pin terminal.

The pin terminal of the specimen No. 101 and a pin terminal of a specimen No. 102 to be described later were both pin terminals of the 0.64 type and fabricated using a plated plate including a brass plate as the copper alloy plate.

(Specimen No. 102)

A pin terminal of the specimen No. 102 is a specimen in which tin-based layers are provided by the so-called pre-plating method. This pin terminal includes the tin-based layers covering first and second surfaces of a base material from one end to the other end of the base material. Third and fourth surfaces of the base material are exposed without including tin-based layers from the one end to the other end of the base material.

Note that the presence of the tin-based layer covering the base material in the pin terminal of each specimen is confirmed, for example, by taking the aforementioned cross-section and performing a component analysis for the cross-section. The component analysis is performed, for example, utilizing an energy distribution type X-ray spectrometer (SEM-EDX) belonging to a scanning type electronic microscope.

(Thickness Measurement of Tin-Based Layer)

The thickness of the tin-based layer present in the region on the one end side of the base material was measured in the pin terminal of each specimen. The thickness of the tin-based layer was not measured for the specimen No. 102 fabricated using the pre-plating method.

The tin-based layer is present over the entire periphery in the circumferential direction of the base material as described above in the region on the one end side of the base material in each of the pin terminals of the specimens No. 1 to No. 7, No. 50 and No. 101. Spots of 1 mm from one end of the pin terminal along the longitudinal direction of the pin terminal are set as measurement locations for the thickness of the tin-based layer in the region on one end side of this base material.

The measurement points are set for each of the first to fourth surfaces of the base material.

The measurement points on the respective surfaces are set at positions facing each other. Specifically, the measurement points are set at and near a center position in a width direction of each surface for the first and second surfaces. The measurement points are set at and near a center position in a height direction of each surface for the third and fourth surfaces.

The thicknesses of the tin-based layers were measured using a commercially available fluorescent X-ray film thickness meter here. Further, a thickness of the inner layer, which was the alloy layer, and a thickness of the outer layer, which was a pure tin layer, were respectively measured at each of the above measurement points, utilizing a component analysis by the fluorescent film thickness meter. The thickness of the tin-based layer is the sum of the thickness of the inner layer and that of the outer layer. Note that the thickness of the tin-based layer may be measured by taking the cross-section of the pin terminal and using an image obtained by observing this cross-section by SEM or the like.

Further, in the specimens No. 1 to No. 7 and No. 50, the thickness of the tin-based layer was measured also at positions separated from one end of the pin terminal. Specifically, spots of 3 mm and 5 mm from the one end of the pin terminal along the longitudinal direction of the pin terminal were respectively set as measurement locations for the thickness of the tin-based layer present on the aforementioned one end side of the base material. At each measurement location, the aforementioned measurement points were set for each of the four surfaces of the base material. The thickness of the tin-based layer was measured at each measurement point.

The number of the samples of each specimen was set to 3 and the thickness of the tin-based layer was measured for each sample. Further, in the specimens No. 1 to No. 7 and No. 50, the thickness of the inner layer and that of the outer layer were measured for each of the three samples. Average values of the three samples are shown in Table 1 for each of the thickness of the tin-based layer, that of the inner layer and that of the outer layer. Measurement results of the specimens No. 1 to No. 4, which are the pin terminals of the 0.64 type, out of the specimens No. 1 to No. 7, are extracted and shown in Table 1. Measurement results of the specimens No. 5 to No. 7 are not shown.

A maximum value $t_1$ (μm) and a minimum value $t_2$ (μm) of the thickness of the tin-based layer for the spot of 1 mm from the tip are shown in Tables 2 and 3. Further, a difference ($t_1-t_2$) (μm) between the maximum value $t_1$ and the minimum value $t_2$ and a ratio ($t_2/t_1$) of the minimum value $t_2$ to the maximum value $t_1$ are shown in Tables 2 and 3.

Further, in the specimens No. 1 to No. 7 and No. 50, a minimum value of the thickness of the inner layer set as a thickness $t_{31}$ (μm) and a minimum value of the thickness of the outer layer set as a thickness $t_{32}$ (μm), out of the tin-based layer covering the third and fourth surfaces of the base material, at the spot of 1 mm from the tip are shown in Table 2 and 3.

Further, for the specimens No. 1 to No. 7 and No. 50, a thickness difference of the tin-based layer in the longitudinal direction of the base material was examined Specifically, spots of 1 mm, 3 mm and 5 mm from the one end in the tin-based layer present in the region on the one end side of the base material were set as measurement locations for the thickness of the tin-based layer, and measurement points are set as described above at each measurement location. A difference between a maximum thickness and a minimum thickness is taken for the thicknesses of the tin-based layer measured at three measurement points on each surface, e.g. the first surface, of the base material. Out of a total of four differences obtained for the respective surfaces of the base material, a maximum value is shown in an item “Thickness Difference in Longitudinal Direction on One End Side” of Table 2. Measurement results of the specimens No. 1 to No. 4 and No. 50 are extracted and shown in Table 2.

(Solder Wettability)

A maximum wetting force (mN) of the region on the one end side of the base material was measured in the pin terminal of each specimen.

The maximum wetting force was measured as follows. The number of samples of each specimen was set to 3, the maximum wetting force was measured for each sample, and an average value of three measurement values is shown in Table 3 and Table 4 to be described later. The maximum wetting force was not measured for the specimen No. 101 fabricated using the post-plating method. Out of the specimens No. 1 to No. 7, measurement results of the specimens No. 3 and No. 5 to No. 7 are shown in Table 3. Measurement results of the specimens No. 1, No. 2, No. 4 and No. 50 are shown in Table 4.

The maximum wetting force is measured using a commercially available meniscograph tester.

A test is conducted in accordance with a test procedure of JIS C 60068-2-54:2009 as described in JIS C 5402-12-7:2005. Test conditions are set as follows with reference to JIS C 60068-2-54:2009.

<Test Conditions>

Solder used in the test is a lead-free solder alloy.

A flux used in the test is a rosin flux, which is a low activity flux. This rosin flux is an IPA solution in which 25% by mass of rosin is dissolved in 75% by mass of isopropyl alcohol (IPA).

Immersion temperature is 245° C.±10° C.

Immersion speed is 4 mm/sec±2 mm/sec.

Immersion depth is 1.5 mm±0.5 mm

Time until immersion into solder after the application of the flux is fixed.

The test is conducted with the immersion temperature, immersion speed and immersion depth of the solder set in the meniscograph tester to obtain a wetting balance curve. If the commercially available meniscograph tester is utilized, the maximum wetting force is automatically obtained from the shape of a wetting balance curve.

(Number of Tin Projections)

The number of tin projections formed on the tin-based layer present in the region on the one end side of the base material was measured in the pin terminal of each specimen.

The number of tin projections was measured as follows. The number of samples of each specimen was set to 3, a total number of whiskers, which are needle-like projections as described above, and nodules, which are spherical projections, was measured for each sample, and an average value of three measurement values is shown in Table 3 and Table 4 to be described later. The number of tin projections was not measured for the specimens No. 101 and No. 102. Measurement results of the specimens No. 3 and No. 5 to No. 7, out of the specimens No. 1 to No. 7, are shown in Table 3. Measurement results of the specimens No. 1, No. 2, No. 4 and No. 50 are shown in Table 4.

The number of tin projections is measured under the following conditions.

The pin terminals of the respective specimens are held in the following hot and humid environment for a predetermined time to fabricate test pieces.

Environment conditions include a temperature of 85° C. and a humidity of 85%. The holding time is 60 hrs.

In each fabricated test piece, the surface of the tin-based layer present in the region on the one end side of the base material is observed by a commercially available three-dimensional laser microscope. An observation region on the surface of this tin-based layer is a part of the tin-based layer covering the third or fourth surface of the base material, and is selected from a range from a spot of 0.5 mm to a spot of 1.5 mm from one end of the pin terminal along the longitudinal direction of the pin terminal.

In this microscope observation image, the numbers of nodules and whiskers are counted.

An observation visual field is a square having one side length of 0.35 mm. An observation magnification is so adjusted that the nodules in the order of several µm can be measured.

(Quality of Soldering)

Lengths (mm) of solder icicles were examined after soldering was applied to the region on the one end side of the base material in the pin terminal of the specimen No. 3 in which the base material is phosphor bronze and the pin terminal of the specimen No. 3-1 in which the base material is brass. Solder used in soldering is a lead-free solder alloy.

The lengths of the solder icicles were measured as follows. The region on the one end side in the pin terminal of each specimen was enlarged and observed by a commercially available microscope, and the lengths of the solder icicles were measured using this observation image. The length of the solder icicle is assumed as a distance from one end of the pin terminal to the tip of the solder icicle. The shorter the solder icicles, the better the soldering.

TABLE 1

| | | Specimen No. | | | | | | | | | | | | | | | |
|---|---|---|---|---|---|---|---|---|---|---|---|---|---|---|---|---|---|
| | | 1 | | | 2 | | | 3 | | | 4 | | | 50 | | | 101 |
| | | Heat Treatment Temperature (C. °) | | | | | | | | | | | | | | | |
| | | — | | | 200 | | | 210 | | | 220 | | | 240 | | | — |
| | | Thickness of Tip Covering Portion (µm) | | | Thickness of Tip Covering Portion (µm) | | | Thickness of Tip Covering Portion (µm) | | | Thickness of Tip Covering Portion (µm) | | | Thickness of Tip Covering Portion (µm) | | | |
| Measurement Location | Distance from Tip | Sn-Based Layer | Inner Layer Alloy | Outer Layer Pure Sn | Sn-Based Layer | Inner Layer Alloy | Outer Layer Pure Sn | Sn-Based Layer | Inner Layer Alloy | Outer Layer Pure Sn | Sn-Based Layer | Inner Layer Alloy | Outer Layer Pure Sn | Sn-Based Layer | Inner Layer Alloy | Outer Layer Pure Sn | Sn-Based Layer |
| First | 1 mm | 2.80 | 0.40 | 2.40 | 2.55 | 0.40 | 2.15 | 3.24 | 0.39 | 2.85 | 2.57 | 0.42 | 2.15 | 6.36 | 0.67 | 5.69 | 0.65 |
| Surface | 3 mm | 2.54 | 0.39 | 2.16 | 2.22 | 0.39 | 1.82 | 2.85 | 0.39 | 2.46 | 2.35 | 0.41 | 1.95 | 4.20 | 0.72 | 3.48 | — |
| Burr | 5 mm | 1.99 | 0.36 | 1.63 | 1.89 | 0.38 | 1.52 | 2.29 | 0.37 | 1.91 | 1.84 | 0.40 | 1.44 | 3.66 | 0.66 | 3.00 | — |
| Second | 1 mm | 2.81 | 0.38 | 2.43 | 2.64 | 0.40 | 2.24 | 3.28 | 0.42 | 2.85 | 2.63 | 0.43 | 2.20 | 5.91 | 0.88 | 5.02 | 0.58 |
| Surface | 3 mm | 2.58 | 0.39 | 2.19 | 2.48 | 0.39 | 2.09 | 3.07 | 0.42 | 2.65 | 2.44 | 0.42 | 2.03 | 2.86 | 0.64 | 2.22 | — |
| Dull | 5 mm | 2.28 | 0.37 | 1.90 | 2.25 | 0.38 | 1.86 | 2.53 | 0.39 | 2.14 | 2.22 | 0.39 | 1.83 | 2.81 | 0.63 | 2.18 | — |
| Third | 1 mm | 1.58 | 0.11 | 1.47 | 1.30 | 0.20 | 1.10 | 1.91 | 0.30 | 1.61 | 1.45 | 0.32 | 1.13 | 1.37 | 1.18 | 0.19 | 0.57 |
| Surface | 3 mm | 1.48 | 0.10 | 1.38 | 1.23 | 0.19 | 1.04 | 1.73 | 0.28 | 1.45 | 1.35 | 0.32 | 1.03 | 1.32 | 1.12 | 0.20 | — |
| | 5 mm | 1.16 | 0.10 | 1.06 | 1.03 | 0.19 | 0.84 | 1.29 | 0.28 | 1.01 | 1.13 | 0.30 | 0.83 | 1.09 | 1.02 | 0.08 | — |
| Fourth | 1 mm | 1.68 | 0.09 | 1.59 | 1.28 | 0.18 | 1.10 | 1.93 | 0.28 | 1.65 | 1.53 | 0.29 | 1.24 | 1.51 | 1.19 | 0.32 | 0.71 |
| Surface | 3 mm | 1.56 | 0.09 | 1.47 | 1.29 | 0.17 | 1.12 | 1.70 | 0.29 | 1.41 | 1.42 | 0.33 | 1.09 | 1.30 | 1.14 | 0.16 | |
| | 5 mm | 1.20 | 0.09 | 1.11 | 1.13 | 0.18 | 0.95 | 1.32 | 0.29 | 1.03 | 1.15 | 0.31 | 0.84 | 1.20 | 1.04 | 0.16 | — |

TABLE 2

| | | Specimen No. | | | | | |
|---|---|---|---|---|---|---|---|
| | | 1 | 2 | 3 | 4 | 50 | 101 |
| Heat Treatment Temperature ° C. | | — | 200 | 210 | 220 | 240 | — |
| Region on One End Side | Maximum Value $t_1$ | 2.81 | 2.64 | 3.28 | 2.63 | 6.36 | 0.71 |
| Spot of 1 mm From Tip | Minimum Value $t_2$ | 1.58 | 1.28 | 1.91 | 1.45 | 1.37 | 0.57 |
| | Difference $(t_1 - t_2)$ | 1.23 | 1.36 | 1.37 | 1.18 | 4.99 | 0.14 |
| | Ratio $(t_2/t_1)$ | 0.56 | 0.49 | 0.58 | 0.55 | 0.22 | 0.80 |
| Thickness of Sn-Based | Thin Film_Inner Layer $t_{31}$ | 0.09 | 0.18 | 0.28 | 0.29 | 1.18 | — |
| Layer µm | Thin Film_Outer Layer $t_{32}$ | 1.47 | 1.10 | 1.61 | 1.13 | 0.19 | — |
| Thickness Difference in Longitudinal Direction µm on One End Side | | 0.81 | 0.66 | 0.95 | 0.73 | 3.10 | — |

TABLE 3

| | | Specimen No. | | | | |
|---|---|---|---|---|---|---|
| | | 5 0.5 Type | 6 1.0 Type | 7 2.8 Type | 3 0.64 Type | 102 0.64 Type |
| Heat Treatment Temperature ° C. | | 210 | 210 | 210 | 210 | — |
| Region on One End Side | Maximum Value $t_1$ | 2.82 | 2.64 | — | 3.28 | — |
| Spot of 1 mm From Tip | Minimum Value $t_2$ | 1.48 | 1.31 | — | 1.91 | — |
| | Difference $(t_1 - t_2)$ | 1.34 | 1.33 | — | 1.37 | — |
| | Ratio $(t_2/t_1)$ | 0.52 | 0.50 | — | 0.58 | — |

TABLE 3-continued

| | | Specimen No. | | | | |
|---|---|---|---|---|---|---|
| | | 5<br>0.5 Type | 6<br>1.0 Type | 7<br>2.8 Type | 3<br>0.64 Type | 102<br>0.64 Type |
| Thickness of Sn-Based | Inner Layer $t_{31}$ | 0.24 | 0.11 | 0.10 | 0.28 | — |
| Layer µm | Outer Layer $t_{32}$ | 1.24 | 1.20 | 1.05 | 1.61 | — |
| Solder Wettability | Maximum Wetting Force mN | 0.29 | 0.37 | 0.48 | 0.47 | Not Measurable |
| Number of Tin Projections | Tin Projections pieces/0.35 mm × 0.35 mm | 35 | 12 | 0 | 0 | — |

As shown in Tables 2 and 3, it is found that the difference ($t_1-t_2$) is 0.20 µm or more and larger than the difference of the specimen No. 101 in any of the specimens No. 1 to No. 7 and No. 50. Further, it is found that the thickness of the tin-based layer present on the first or second surface of the base material has the maximum value $t_1$ and the thickness of the tin-based layer present on the third or fourth surface of the base material has the minimum value $t_2$ in the specimens No. 1 to No. 7 and No. 50. That is, each of the pin terminals of the specimens No. 1 to No. 7 and No. 50 can be said to have the thin film portion having the minimum value $t_2$ and the thick film portion having the maximum value $t_1$ at different positions in the circumferential direction of the base material in the region on the one end side of the base material.

Further, as shown in Tables 2 and 3, it is found that the ratio ($t_2/t_1$) is 0.2 or more and less than 0.8 and smaller than the ratio of the specimen No. 101 in any of the specimens No. 1 to No. 7 and No. 50. That is, in the specimens No. 1 to No. 7 and No. 50, the difference between the maximum value $t_1$ and the minimum value $t_2$ is large to a certain extent in the region on the one end side of the pin terminal.

From the above, in the specimens No. 1 to No. 7 and No. 50, it can be said that the tin-based layer entirely covering the base material in the circumferential direction is provided, the thickness of this tin-based layer varies in the circumferential direction of the base material and the thickness difference is large to a certain extent in the region on the one end side of the base material. These can also be confirmed from micrographs shown in FIGS. 8A to 8E.

Figure 8A:
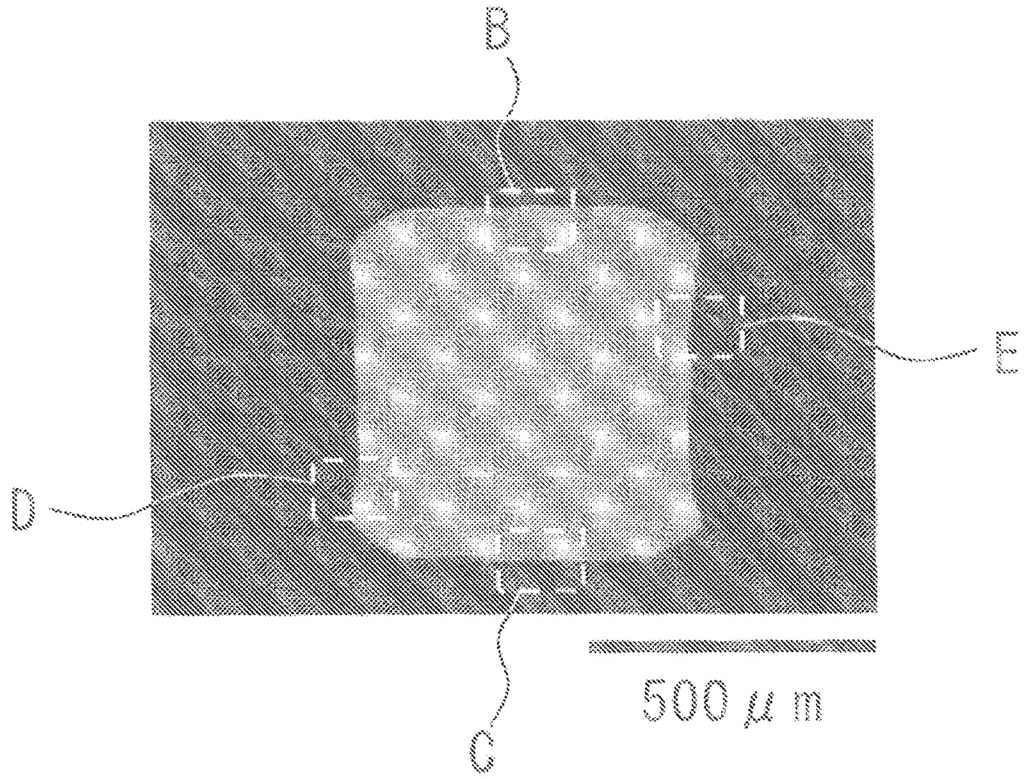
FIG. 8A shows a micrograph obtained by photographing a cross-section of a region on one end side of a pin terminal of a specimen No. 3 fabricated in test example 1 cut by a plane orthogonal to an axis of the pin terminal.
Figure 8B:
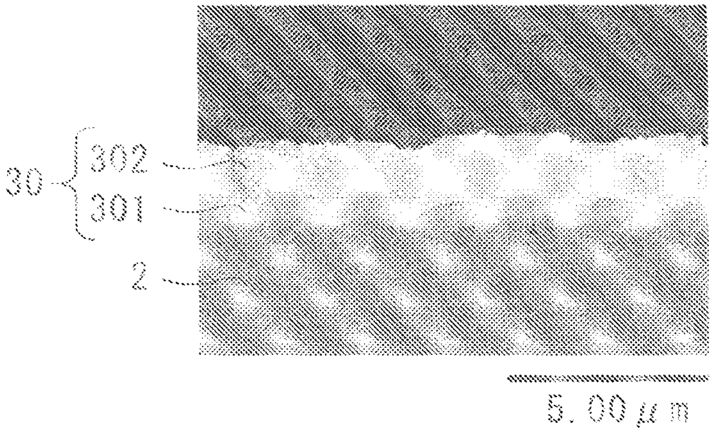
FIG. 8B shows a micrograph enlargedly showing a region enclosed by a broken-line rectangle B in the micrograph of FIG. 8A.
Figure 8C:
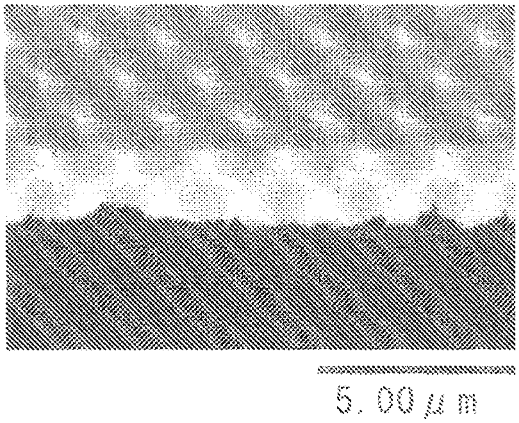
FIG. 8C shows a micrograph enlargedly showing a region enclosed by a broken-line rectangle C in the micrograph of FIG. 8A.
Figure 8D:
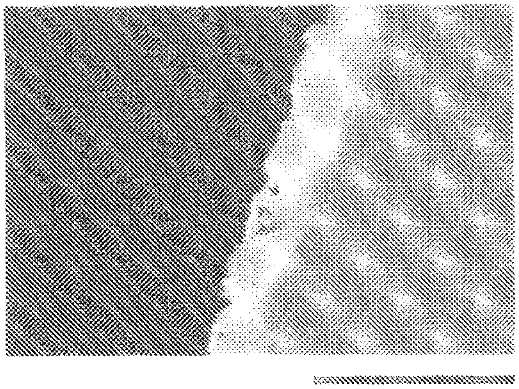
FIG. 8D shows a micrograph enlargedly showing a region enclosed by a broken-line rectangle D in the micrograph of FIG. 8A.
Figure 8E:
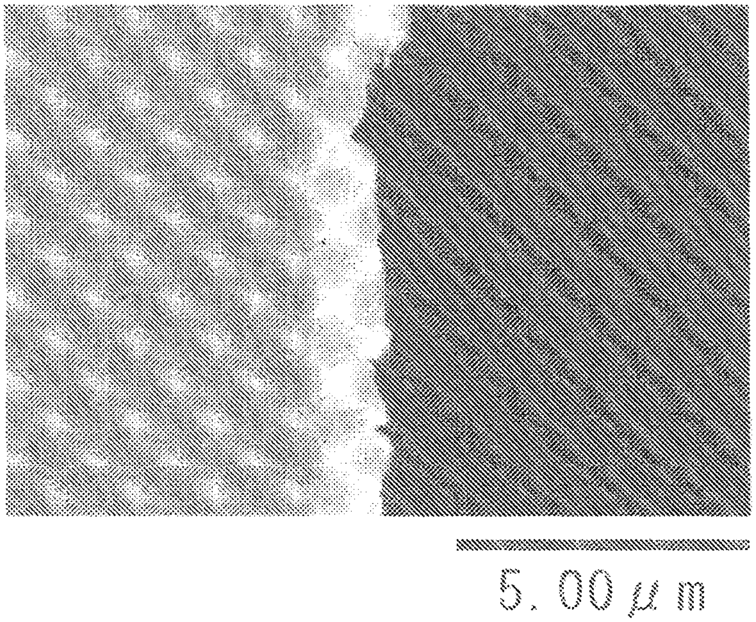
FIG. 8E a micrograph enlargedly showing a region enclosed by a broken-line rectangle E in the micrograph of FIG. 8A.

FIG. 8A shows a SEM image obtained by observing a cross-section by SEM for one sample, out of the pin terminals of the specimen No. 3. This cross-section is obtained by cutting the region on the one end side of the base material by a plane parallel to the axis of the base material at a spot of 3 mm from one end of the pin terminal along the longitudinal direction of the pin terminal.

FIGS. 8B to 8E enlargedly show rectangular regions enclosed by white broken lines in FIG. 8A.

FIGS. 8B to 8E successively show the tin-based layer covering the first, second, third and fourth surfaces of the base material. In FIGS. 8B to 8E, a dark grey region is the base material 2, and a black region is an embedding resin. A grey region present between the base material 2 and the embedding resin is the tin-based layer 30. Out of the tin-based layer 30, a region near the base material 2 is the inner layer 301 made of alloy containing tin and alloy. Out of the tin-based layer 30, a light grey region in contact with the inner layer 301 is the outer layer 302 made of pure tin. These are denoted by reference signs only in FIG. 8B.

FIGS. 8B and 8C and FIGS. 8D and 8E are compared. From this comparison, the thicknesses of the tin-based layer, the inner layer and the outer layer covering the first and second surfaces of the base material are all larger than the thicknesses of the tin-based layer, the inner layer and the outer layer covering the third and fourth surfaces of the base material. Matters concerning these thickness differences are similar also when the cutting position was a spot of 1 mm from the one end of the pin terminal along the longitudinal direction of the pin terminal. Further, the matters concerning these thickness differences are similar also for the specimens No. 1, No. 2 and No. 4 to No. 7.

As shown in Table 3 and Table 4 to be described later, the specimens No. 1 to No. 7 are found to have a maximum wetting force of 0.25 mN or more and be excellent in solder wettability. One of reasons why the maximum wetting forces of the specimens No. 1 to No. 7 are high is that the tin-based layer entirely covering the base material in the circumferential direction is provided in the region on the one end side of the base material. Particularly, this tin-based layer includes the outer layer made of pure tin and the thickness of the outer layer is appropriate. Quantitatively, the thickness of the outer layer provided in the thin film portion, out of the tin-based layer, is 0.5 µm or more, here 1.0 µm or more. The thickness of the outer layer provided in the thick film portion is larger than the thickness $t_{32}$ of the outer layer of the thin film portion. That is, the pure tin layer excellent in solder wettability is properly present over the entire periphery in the circumferential direction of the base material in the region on the one end side of the base material.

On one hand, the maximum wetting force of the specimen No. 50 is less than 0.25 mN as shown in Table 4 to be described later. One of reasons why the maximum wetting force of the specimen No. 50 is low is thought to be that the heat treatment temperature of the specimen No. 50 is higher than those of the specimens No. 2 to No. 7.

On the other hand, the maximum wetting force cannot be measured for the specimen No. 102 and the specimen No. 102 is poor in solder wettability. One of reasons for this is thought to be that the base material is partially exposed, here the third and fourth surfaces of the base material are exposed, in the region on the one end side of the base material.

In the specimens No. 1 to No. 7 and No. 50, whiskers, which are the aforementioned needle-like projections, were not observed. In some specimens, only nodules, which are spherical projections, were observed. Accordingly, the number of the tin projections shown in Table 3 and Table 4 to be described later is the number of the nodules. As shown in Tables 3 and 4, it is found that the number of the nodules in 0.35 mm×0.35 mm is 15 or less and no whisker is present and, in addition, the number of the nodules is small in the specimens No. 2 to No. 7 and No. 50 except the specimen No. 5. Particularly, the number of the nodules in the specimens No. 3, No. 4, No. 7 and No. 50 is 0 and the whiskers and the nodules are substantially not present. One of reasons why the numbers of the whiskers and nodules are small in the specimens No. 2 to No. 7 and No. 50 is as follows. The tin-based layer is provided in contact with the third and fourth surfaces, which are exposed regions of the base material, but includes the following inner layer. The inner layer is made of alloy containing tin and copper and has an appropriate thickness. Quantitatively, the thickness $t_{31}$ of the inner layers in the thin film portions provided in contact with the third and fourth surfaces of the base material is 0.1 μm or more. The thickness of the inner layer provided in the thick film portion is larger than the thickness $t_{31}$ of the inner layer of the thin film portion. That is, it can be said that the alloy layer having a function to suppress the formation of whiskers and nodules is properly present over the entire periphery in the circumferential direction of the base material in the region on the one end side of the base material. Thus, whiskers and nodules are unlikely to be formed on the surface of the tin-based layer in the specimens No. 2 to No. 7 and No. 50 even if the underlayer is not provided.

On the other hand, in the specimen No. 1, the number of the nodules in 0.35 mm×0.35 mm is more than 35 as shown in Table 4 to be described later. Further, in the specimen No. 1, the thickness $t_{31}$ of the inner layer of the thin film portion is less than 0.1 μm. Many nodules are thought to be formed in the specimen No. 1 since the thickness $t_{31}$ of the inner layer is small. One of reasons for this is thought to be that the heat treatment was not performed after secondary plating for the specimen No. 1.

Besides, the maximum value of the aforementioned difference is 1 μm or less in the specimens No. 1 to No. 4 as shown in the item "Thickness Difference in Longitudinal Direction on One End side" of Table 2. The thickness difference of the tin-based layer in the longitudinal direction of the base material can be said to be small in the region on the one end side of the base material. This point is similar also for the specimens No. 5 to No. 7. On the other hand, the maximum value of the difference is as large as more than 3 μm in the specimen No. 50. One of reasons why the maximum value of the difference is large is thought to be that the heat treatment temperature of the specimen No. 50 is higher than those of the specimens No. 2 to No. 7, particularly higher than the melting point of tin. It is thought that the secondary plating layer was melted during the heat treatment and the thickness of the tin-based layer became nonuniform after the heat treatment since the heat treatment temperature was higher the melting point of tin.

Further, the thickness of the tin-based layer present on the first and second surfaces of the base material in the region on the other end side of the base material where secondary plating had not been performed was examined for the pin terminals of the specimens No. 1 to No. 7 and No. 50. Here, the maximum value of the difference between the maximum thickness and the minimum thickness was examined as in the case of evaluating the aforementioned thickness difference in the longitudinal direction. As a result, it can be said that the maximum value of the difference is less than 0.2 μm and the tin-based layer has a uniform thickness in the longitudinal direction of the base material in the specimens No. 1 to No. 7. The maximum value of the specimen No. 50 is 0.2 μm or more and the tin-based layer can be said to have an enlarged part. One of reasons for this is that the heat treatment temperate of the specimen No. 50 is higher than those of the specimens No. 2 to No. 7, particularly higher than the melting point of tin. It is thought that the primary plating layer covering the first and second surfaces was melted during the heat treatment and the thickness of the tin-based layer became nonuniform after the heat treatment since the heat treatment temperate was higher than the melting point of tin.

Next, the quality of soldering is described.

A length of a solder icicle of the specimen No. 3-1 in which the base material is made of brass is 0.77 mm A length of a solder icicle of the specimen No. 3 in which the base material is made of phosphor bronze is 0.17 mm and shorter than that of the specimen No. 3-1. One of reasons for this is thought to be that the Zn content is 20% by mass or less, here 0.05% by mass or more and 0.20% by mass or less and is less than brass having a Zn content of more than 28% by mass in the base material of the specimen No. 3. The formation of solder icicles is thought to be suppressed due to a small Zn content in the specimen No. 3.

From the above, it was shown that the pin terminal including the tin-based layer covering the entire periphery in the circumferential direction of the base material and having a thickness varying in the circumferential direction of the base material in the region on the one end side of the base material, particularly the pin terminal having the thickness $t_{32}$ of 0.5 μm or more of the pure tine layer in the thin film portion provided in the tin-based layer, was excellent in solder wettability. Further, it was shown that not only the number of the whiskers, but also the number of the nodules are small if the thickness $t_{31}$ of the alloy layer in the thin film portion is 0.1 μm or more. Solder wettability and the number of tin projections are described in more detail in test example 2 to be described later.

The aforementioned effect of being excellent in solder wettability and effect of having small numbers of whiskers and nodules were shown to be obtained without depending on the composition of the constituent material of the base material. Further, it was shown that solder icicles were short and a soldering failure was reduced if the Zn content was 20% by mass or less when the constituent material of the base material was a copper alloy.

Moreover, the aforementioned pin terminal excellent in solder wettability was shown to include the tin-based layer having a uniform thickness in the longitudinal direction of the base material in the region on the other end side of the base material. It can be said that such a pin terminal is excellent in insertability since the region on the other end side is easily inserted into the mating terminal.

The pin terminal excellent in solder wettability and, in addition, excellent in insertability into the mating terminal and further having a small number of whiskers was proven to be manufactured by utilizing the aforementioned multi-stage plating method, particularly by setting the heat treatment temperature after secondary plating to or below the melting point of the tin. The heat treatment temperature is described in more detail in test example 2 to be described later.

Note that the measurement points for the thickness of the tin-based layer are set as follows if the cross-sectional shape of the base material is a rectangular shape, a polygonal shape, a circular shape or the like other than a square shape. If the cross-sectional shape of the base material is a rectangular shape or a polygonal shape, measurement points are set at and near a widthwise center position of one arbitrary surface of the base material at a spot of 1 mm or the like from the tip. Positions facing these measurement points are also set as measurement points. Further, positions facing each other in a direction orthogonal to a straight line connecting the both measurement points are also set as measurement points. If the cross-sectional shape is a circular shape, positions facing each other in an arbitrary diameter direction and positions facing each other in a diameter direction shifted by 90° from the former diameter direction are respectively set as measurement points at the spot of 1 mm or the like from the tip.

Test Example 2

A relationship of the heat treatment temperature after secondary plating and the maximum wetting force and the number of tin projections of the pin terminal was examined.

thickness $t_{31}$ (μm) of the inner layer. A vertical axis represents the number of tin projections (pieces/(0.35 mm×0.35 mm)).

Figure 12A:
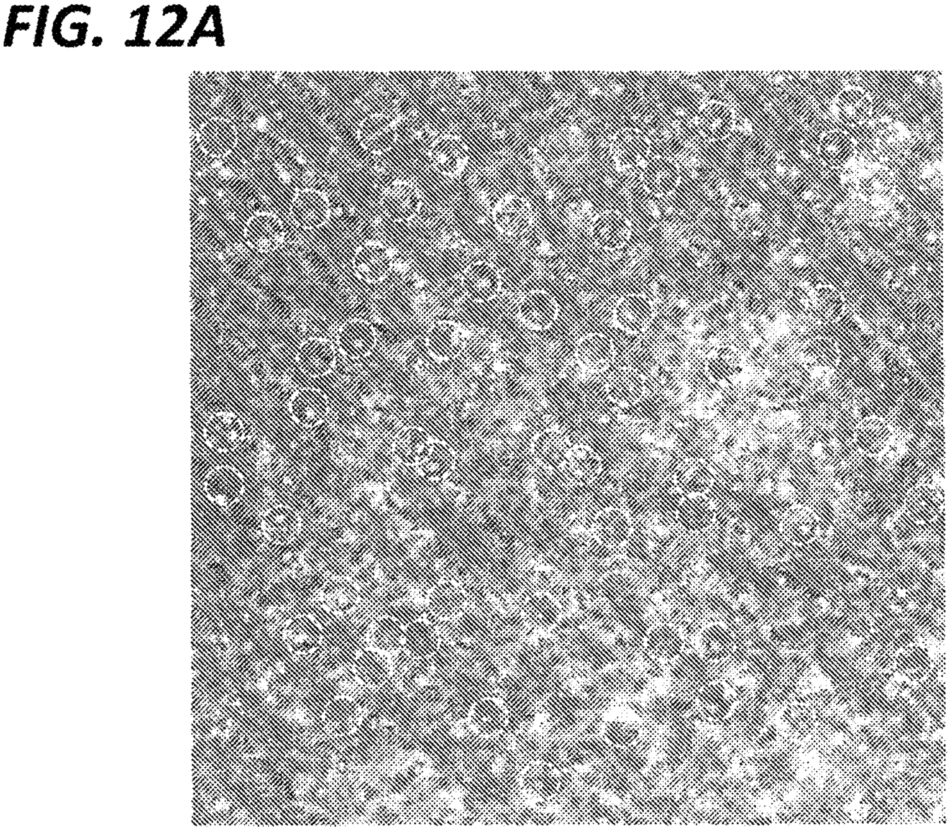
FIG. 12A shows a micrograph obtained by photographing a surface of a thin film portion for the pin terminal of the specimen No. 1, to which a heat treatment was not applied after secondary plating, in test example 2.
Figure 12B:
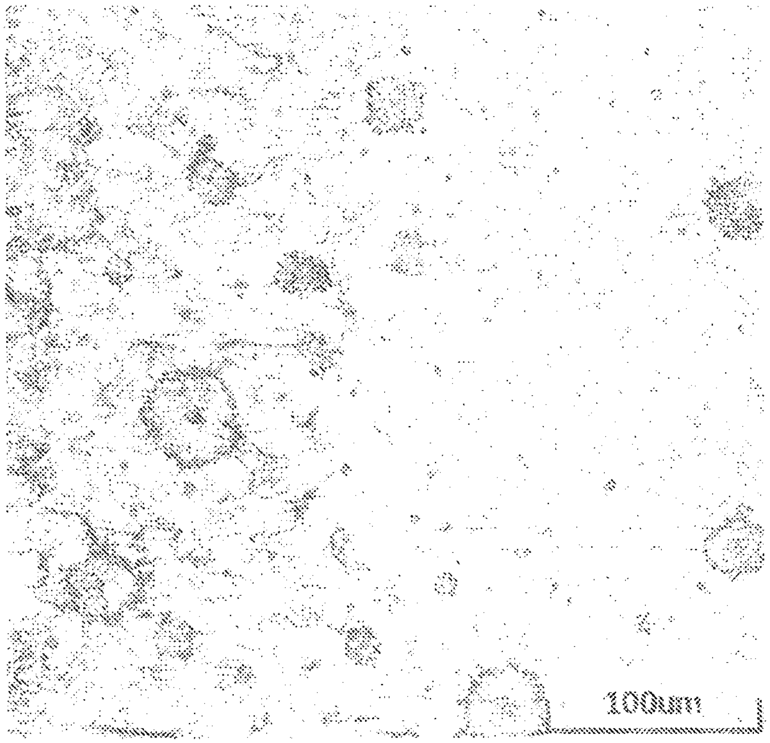
FIG. 12B shows a micrograph obtained by photographing a surface of a thin film portion for the pin terminal of the specimen No. 2, to which the heat treatment was applied at 200° C. after secondary plating, in test example 2.
Figure 12C:
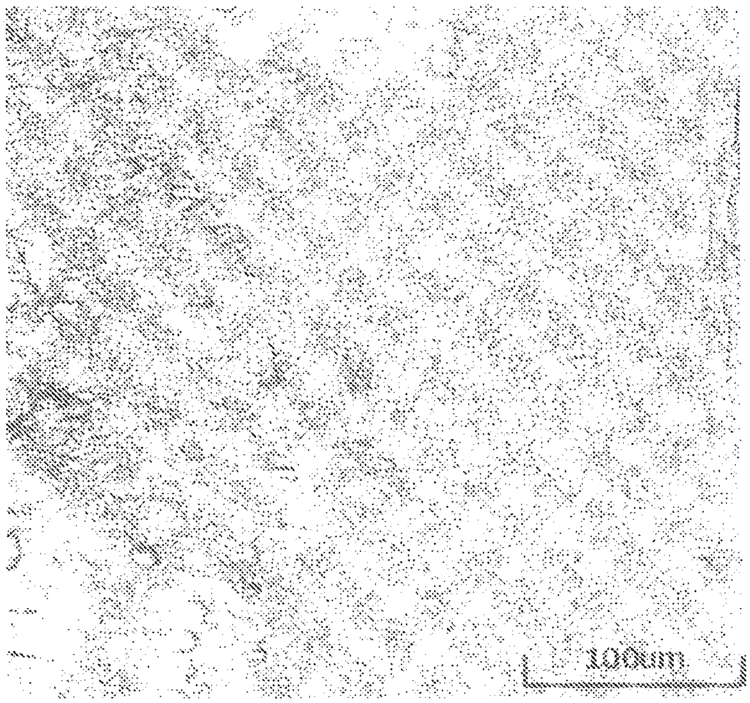
FIG. 12C shows a micrograph obtained by photographing a surface of a thin film portion for the pin terminal of the specimen No. 4, to which the heat treatment was applied at 220° C. after secondary plating, in test example 2.
Figure 12D:
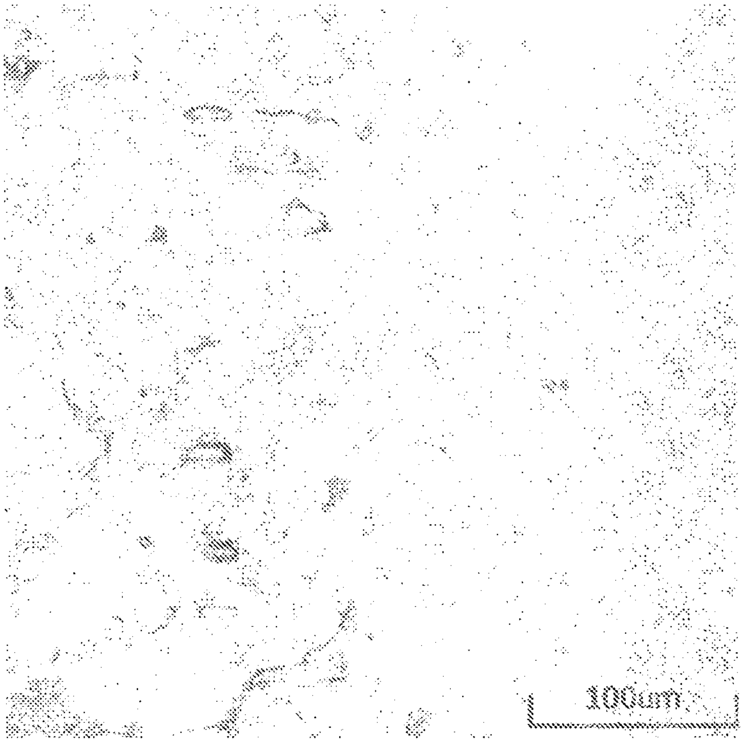
FIG. 12D shows a micrograph obtained by photographing a surface of a thin film portion for the pin terminal of the specimen No. 50, to which the heat treatment was applied at 240° C. after secondary plating, in test example 2.

FIGS. 12A to 12D show microscope observation images utilized in measuring the number of tin projections in the pin terminals of the specimens No. 1, No. 2, No. 4 and No. 5. Any of the microscope observation images of FIGS. 12A and 12D is an image observed by the aforementioned three-dimensional laser microscope and shows a square observation visual field having one side length of 0.35 mm

TABLE 4

| | | Specimen No. | | | | | | |
|---|---|---|---|---|---|---|---|---|
| | | 1 | 51 | 52 | 2 | 3 | 4 | 50 |
| Terminal Size | | 0.64Type | 0.64Type | 0.64Type | 0.64Type | 0.64Type | 0.64Type | 0.64Type |
| Heat Treatment Temperature ° C. | | — | 150 | 180 | 200 | 210 | 220 | 240 |
| Maximum Wetting Force mN | | 0.53 | 0.51 | 0.50 | 0.49 | 0.47 | 0.36 | 0.001 |
| Number of Tin Projection (pieces/0.35 mm × 0.35 mm) | | 35.5 | 25.5 | 19.5 | 9.5 | 0 | 0 | 0 |
| Region on One End Side | Maximum Value $t_1$ | 2.81 | 4.08 | — | 2.64 | 3.28 | 2.63 | 6.36 |
| Spot of 1 mm From Tip | Minimum Value $t_2$ | 1.58 | 1.54 | — | 1.28 | 1.91 | 1.45 | 1.37 |
| | Difference ($t_1 - t_2$) | 1.23 | 2.54 | — | 1.36 | 1.37 | 1.18 | 4.99 |
| | Ratio ($t_2/t_1$) | 0.56 | 0.38 | — | 0.49 | 0.58 | 0.55 | 0.22 |
| Thickness of Sn-Based | Inner Layer $t_{31}$ | 0.09 | 0.13 | 0.20 | 0.18 | 0.28 | 0.29 | 1.18 |
| Layer μm | Outer Layer $t_{32}$ | 1.47 | 1.41 | 1.35 | 1.10 | 1.61 | 1.13 | 0.19 |

Here, in addition to the specimens fabricated in test example 1, the following specimens No. 51, No. 52 were fabricated. The specimens No. 51, No. 52 were fabricated similarly to the specimen No. 3 except that the heat treatment temperature after secondary plating was changed to 150° C. or 180° C. different from the heat treatment temperature of the specimen No. 3.

The heat treatment temperature (° C.) after secondary plating, the maximum wetting force (mN) and the number of tin projections (pieces/(0.35 mm×0.35 mm) for the specimens No. 1 to No. 4 and No. 50 to No. 52 are shown in Table 4. Further, a maximum value $t_1$ (μm), a minimum value $t_2$ (μm) of a tin-based layer present in a region on one end side of a base material, a thickness $t_{31}$ (μm) of an inner layer and a thickness $t_{32}$ (μm) of an outer layer in a thin film portion present on each of third and fourth surfaces of the base material are shown in Table 4 for these specimens. A difference ($t_1-t_2$) and a ratio ($t_2/t_1$) are obtained and results thereof are also shown in Table 4. Measurement methods for the maximum wetting force (mN), the number of tin projections and the thickness of the tin-based layer are similar to those in test example 1.

Figure 9:
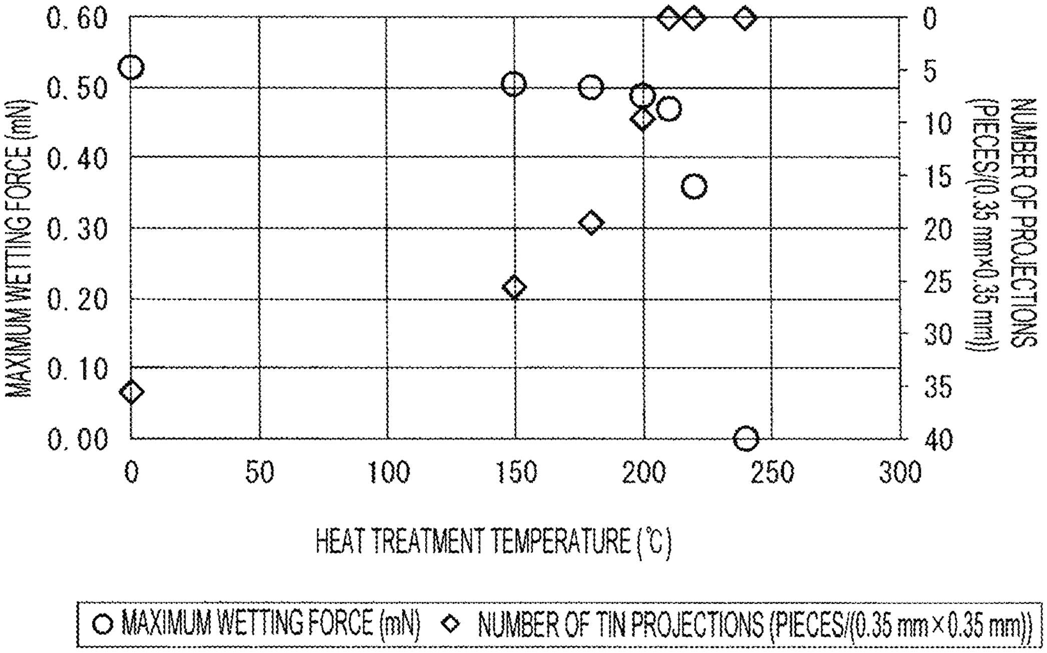
FIG. 9 is a graph showing a relationship of a heat treatment temperature, a maximum wetting force and the number of tin projections for a pin terminal of each specimen fabricated in test example 2.

FIG. 9 is a graph showing the relationship of the heat treatment temperature after secondary plating, the maximum wetting force and the number of tin projections. In this graph, a horizontal axis represents the heat treatment temperature (° C.). A left vertical axis represents the maximum wetting force (mN), and circle marks represent explanatory notes. A right vertical axis represents the number of tin projections (pieces/(0.35 mm×0.35 mm)) and rhombus marks represent explanatory notes.

Figure 10:
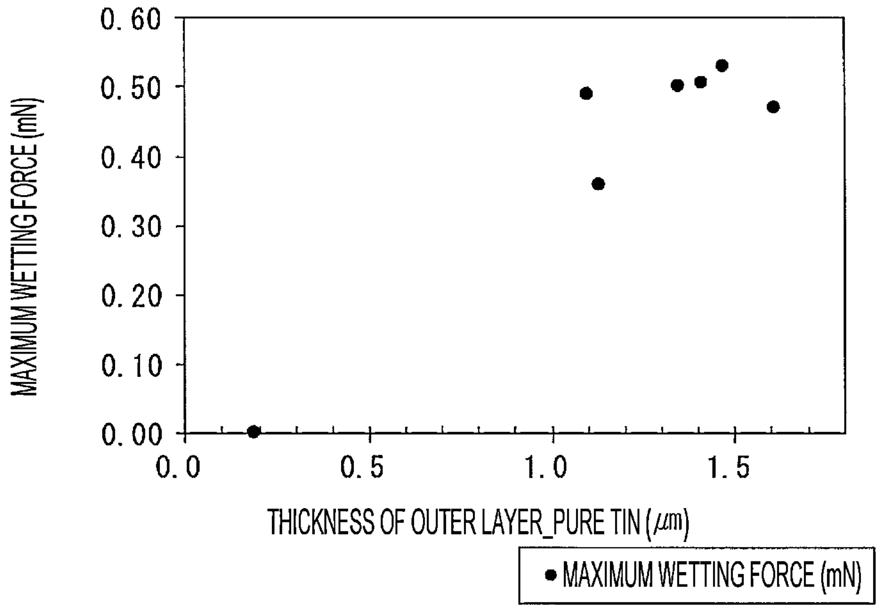
FIG. 10 is a graph showing a relationship of a thickness of an outer layer made of pure tin, out of a tin-based layer present in a region on one end side of a base material, and the maximum wetting force for the pin terminal of each specimen fabricated in test example 2.

FIG. 10 is a graph showing a relationship of the thickness $t_{32}$ of the outer layer of each specimen and the maximum wetting force. In this graph, a horizontal axis represents the thickness $t_{32}$ (μm) of the outer layer. A vertical axis represents the maximum wetting force (mN).

Figure 11:
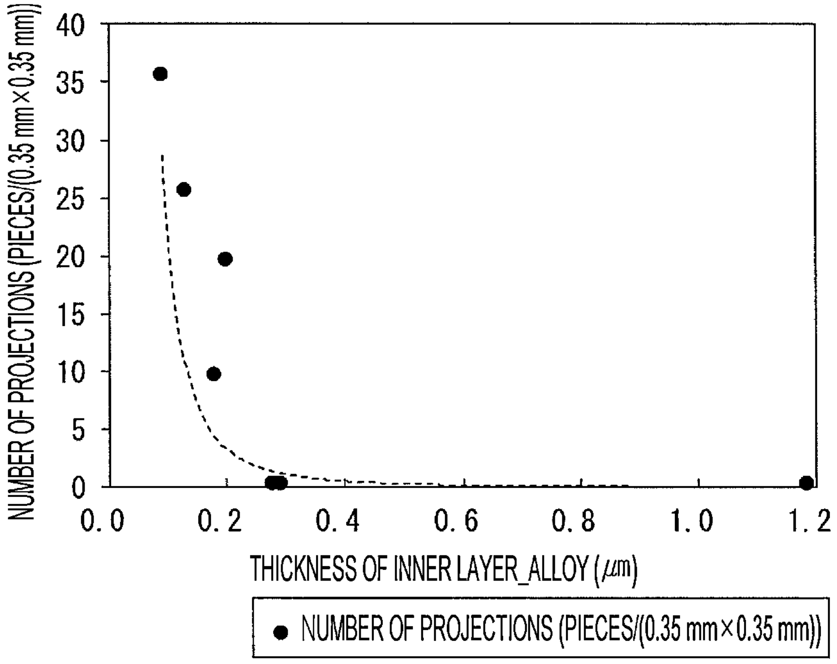
FIG. 11 is a graph showing a relationship of a thickness of an inner layer made of alloy containing tin and copper, out of the tin-based layer present in the region on the one end side of the base material, and the number of tin projections for the pin terminal of each specimen fabricated in test example 2.

FIG. 11 is a graph showing a relationship of the thickness $t_{31}$ of the inner layer of each specimen and the number of tin projections. In this graph, a horizontal axis represents the As shown in Table 4 and FIG. 9, the maximum wetting force and the number of tin projections are affected by the heat treatment temperature after secondary plating.

The maximum wetting force is focused.

The maximum wetting force is substantially constant in a range of the heat treatment temperature of up to 210° C., decreases as the heat treatment temperature rises and extremely drops when the heat treatment temperature reaches 240° C.

Further, as shown in FIG. 10, the maximum wetting force tends to increase as the thickness $t_{32}$ of the outer layer made of pure tin increases in the thin film portion provided in contact with the base material, out of the tin-based layer present in the region on the one end side of the base material. Here, if the thickness $t_{32}$ of the outer layer is 1.0 μm or more, the maximum wetting force is 0.3 mN or more and there are many specimens having a maximum wetting force of 0.4 mN or more. If the thickness $t_{32}$ of the outer layer is 0.5 μm or more, a maximum wetting force of 0.25 mN or more can be expected.

From the above, it can be said that, as the heat treatment temperature drops, the pure tin layer formed by secondary plating remains more after the heat treatment and the thickness $t_{32}$ of the outer layer tends to increase, whereby the maximum wetting force is enhanced. Here, the heat treatment temperature is preferably below 240° C., and preferably below the melting point of tin (about 232° C.) from the tendency of the graph shown in FIG. 9. Further, in terms of improving the maximum wetting force, the heat treatment temperature is more preferably 220° C. or lower.

Next, the number of tin projections is focused.

In any of the specimens, the aforementioned whiskers, which are needle-like projections, were not observed and only nodules, which are spherical projections, were observed in some of the specimens. Accordingly, the number of the tin projections shown in Table 4 and FIGS. 9 and 11 is the number of the nodules. Further, the number of the nodules mentioned below is the number of the nodules present in a visual field of 0.35 mm×0.35 mm.

The number of tin projections is large if the heat treatment is not performed, becomes smaller as the heat treatment temperature rises. As shown in FIG. 12A, in the specimen No. 1 for which the heat treatment was not performed, the aforementioned whiskers, which are needle-like projections, are not present, but there are many nodules exceeding 30. White broken-line circles attached to FIG. 12A enclose some of a plurality of the nodules. Note that even if there are many nodules exceeding 30, a short circuit between the pin terminals due to the nodules is unlikely to occur. However, if there are too many nodules, it is concerned that the nodules grow into whiskers, which are needle-like projections. Thus, the number of only the nodules is preferably 40 or less as in this example.

In contrast, if the heat treatment temperature exceeds 180° C., particularly is 200° C. or higher, the number of the nodules is 15 or less, here 10 or less. Granular parts in centers of a plurality of circular regions in FIG. 12B are the nodules. In this test, if the heat treatment temperature exceeds 200° C., the number of the nodules is 0 and the whiskers and nodules are substantially not present. The above circular regions are not observed in FIGS. 12C and 12D.

Further, as shown in FIG. 11, as the thickness $t_{31}$ of the inner layer made of alloy containing tin and copper increases in the thin film portion provided in contact with the base material, out of the tin-based layer present in the region on the one end side of the base material, the number of the nodules decreases. Here, if the thickness $t_{31}$ of the inner layer is 0.1 μm or more, the number of the nodules is 30 or less. If the thickness $t_{31}$ of the inner layer is 0.2 μm or more, the number of the nodules is 20 or less. Further, if the thickness $t_{31}$ of the inner layer is more than 0.2 μm, the number of the nodules is 15 or less, here 10 or less.

From the above, it can be said that as the heat treatment temperature increases, the number of the whiskers including the nodules decreases since the pure tin layer formed by secondary plating is alloyed by the heat treatment and the thickness $t_{31}$ of the inner layer increases. Here, the heat treatment temperature is preferably higher than 180° C., more preferably 200° C. or higher.

The present disclosure is not limited to these illustrations and is intended to be represented by claims and include all changes in the scope of claims and in the meaning and scope of equivalents.

For example, the compositions and sizes of the base materials, the compositions and thicknesses of the plating layers, the heat treatment conditions and the like in test examples 1 and 2 can be changed as appropriate.

As a modification of the composition of the plating layer, plated plates including an underlayer between a tin-based layer and a copper alloy plate can be used as the plated plates used in test examples 1 and 2. In this case, the region on the one end side of the base material includes the underlayer below the thick film portions of the tip covering portion. The region on the other end side of the base material includes the underlayer below the rear end covering portions, which are tin-based layers.

LIST OF REFERENCE NUMERALS

- 1 pin terminal
- 2 base material
  - 21 first surface, 22 second surface, 23 third surface, 24 fourth surface
  - 26 exposed region
- 3 plating layer
  - 30 tin-based layer, 31 tip covering portion, 32 rear end covering portion
  - 34 thin film portion, 35 thick film portion
  - 300 underlayer, 301 inner layer, 302 outer layer
- 6 connector
  - 60 housing
- 7 wiring harness with connector
  - 70 wiring harness, 71 wire
  - 74, 75, 76 connector
- 8 control unit
  - 80 circuit board, 81 through hole, 85 solder
- 90 material plate, 91 plated plate, 92 forming material
  - 93 partially plated material
  - 94 heat treated material
  - 920 bar-like portion, 925 coupling portion
  - 931 secondary plating layer, 941 heat treated layer
- $t_1$ maximum value, $t_2$ minimum value, $t_{31}$, $t_{32}$, $t_i$, $t_o$ thickness

What is claimed is:

1. A pin terminal, comprising:

a bar-like base material; and a plating layer covering a predetermined region of the base material, wherein:

a constituent material of the base material is pure copper or a copper alloy, the plating layer includes a tin-based layer made of metal containing tin, one end side of the base material includes a tip covering portion, the tin-based layer includes the tip covering portion, the tip covering portion covers an entire region in a circumferential direction on the one end side of the base material, and a difference $(t_1-t_2)$ between a maximum value $t_1$ and a minimum value $t_2$ of a thickness of the tip covering portion measured at a measurement location set at a spot of 1 mm from one end of the pin terminal along a longitudinal direction of the pin terminal is 0.20 μm or more.

2. The pin terminal of claim 1, wherein:

the tip covering portion includes an outer layer and an inner layer, a constituent material of the outer layer is pure tin, and a constituent material of the inner layer is an alloy containing tin and copper.

3. The pin terminal of claim 2, wherein:

the tip covering portion includes a thin film portion and a thick film portion at positions different in the circumferential direction of the base material, the thin film portion is provided in contact with the base material and has the minimum value $t_2$, and the thick film portion has the maximum value $t_1$.

4. The pin terminal of claim 3, wherein:

the number of whiskers present on a surface of the thin film portion is 15 or less in a square visual field having one side length of 0.35 mm, and a maximum wetting force of the tip covering portion measured by a meniscograph tester is 0.25 mN or more.

5. The pin terminal of claim 3, wherein:

a thickness of the outer layer in the thin film portion is 0.5 μm or more, and a thickness of the inner layer in the thin film portion is 0.1 μm or more.

6. The pin terminal of claim 1, wherein:

the constituent material of the base material is the copper alloy, and a Zn content in the copper alloy is 20% by mass or less.

7. The pin terminal of claim 1, wherein:

the other end side of the base material includes a rear end covering portion and an exposed region at positions different in the circumferential direction of the base material, the tin-based layer includes the rear end covering portion, the rear end covering portion covers a partial circumferential region on the other end side of the base material, and the plating layer is not provided and the base material is exposed in the exposed region.

8. The pin terminal of claim 1, wherein, in a cross-section of a part provided with the tip covering portion in the base material cut by a plane orthogonal to an axis of the base material, the base material has a rectangular shape, an outer peripheral surface of the base material has a first surface and a second surface arranged to face each other and a third surface and a fourth surface arranged to face each other, a part of the tip covering portion covering at least one of the first and second surfaces has the maximum value $t_1$, and a part of the tip covering portion covering at least one of the third and fourth surfaces has the minimum value $t_2$.

9. The pin terminal of claim 8, wherein:

the plating layer includes an underlayer between parts of the tip covering portion covering the first and second surfaces and the base material, parts of the tip covering portion covering the third and fourth surfaces are provided in contact with the base material, and a constituent material of the underlayer is pure nickel or a nickel alloy.

10. The pin terminal of claim 8, wherein, in the first, second, third and fourth surfaces, a spot of 1 mm, a spot of 3 mm and a spot of 5 mm from the one end of the pin terminal along the longitudinal direction of the pin terminal are set as measurement locations for the thickness of the tip covering portion, a difference between a maximum thickness and a minimum thickness is taken at the three measurement locations, and a maximum value of the differences is 1.0 μm or less.

11. A connector, comprising the pin terminal of claim 1.

12. A wiring harness with connector, comprising:

the connector of claim 11; and a wiring harness, the wiring harness being connected to a region on the other end side of the pin terminal.

13. A control unit, comprising:

the wiring harness with connector of claim 12; and a circuit board, the circuit board and a region on one end side of the pin terminal being connected by solder.

14. The control unit of claim 13, wherein the circuit board controls at least one of engine fuel injection and engine ignition.

15. A control unit, comprising:

the connector of claim 11; and a circuit board, the circuit board and a region on one end side of the pin terminal being connected by solder.

16. The control unit of claim 15, wherein the circuit board controls at least one of engine fuel injection and engine ignition.

17. A pin terminal, comprising:

a bar-like base material; and a plating layer covering a predetermined region of the base material, wherein:

a constituent material of the base material is pure copper or a copper alloy, the plating layer includes a tin-based layer made of metal containing tin, one end side of the base material includes a tip covering portion, the tin-based layer includes the tip covering portion, the tip covering portion covers an entire region in a circumferential direction on the one end side of the base material, and a ratio $t_2/t_1$ of a maximum value $t_1$ and a minimum value $t_2$ of a thickness of the tip covering portion measured at a measurement location set at a spot of 1 mm from one end of the pin terminal along a longitudinal direction of the pin terminal is 0.20 or more and less than 0.8.

18. The pin terminal of claim 17, wherein a difference $(t_1-t_2)$ between the maximum value $t_1$ and the minimum value $t_2$ is 0.20 μm or more.

* * * * *